United States Patent
Fukasawa et al.

(10) Patent No.: US 6,231,134 B1
(45) Date of Patent: May 15, 2001

(54) VEHICLE BRAKING SYSTEM HAVING FRICTIONAL AND REGENERATIVE BRAKING DEVICES

(75) Inventors: Tsukasa Fukasawa, Aichi-ken; Akira Sakai; Hiroki Asada, both of Toyota; Junichi Sakamoto, Gotenba; Shingo Urababa, Toyota; Yoshinori Suzuki, Aichi-ken; Toshiyuki Sakai, Kariya; Naoyasu Enomoto, Handa, all of (JP)

(73) Assignees: Toyota Jidosha Kabushiki Kaisha, Toyota; Aisin Seiki Kabushiki Kaisha, Kariya, both of (JP)

( * ) Notice: Subject to any disclaimer, the term of this patent is extended or adjusted under 35 U.S.C. 154(b) by 0 days.

(21) Appl. No.: 09/123,353

(22) Filed: Jul. 28, 1998

(30) Foreign Application Priority Data

Sep. 16, 1997 (JP) .................................................. 9-250546

(51) Int. Cl.[7] ..................................................... B60T 8/64
(52) U.S. Cl. ............................................... 303/152; 303/3
(58) Field of Search ................................... 303/3, 15, 20, 303/112, 152; 701/70, 73, 80; 180/165, 65.2, 65.3, 65.4, 65.8

(56) References Cited

U.S. PATENT DOCUMENTS

| | | | |
|---|---|---|---|
| 4,683,537 | * 7/1987 | Matsuda | 364/426 |
| 5,399,000 | * 3/1995 | Aoki et al. | 303/3 |
| 5,450,324 | * 9/1995 | Cikanek | 364/426.02 |
| 5,465,806 | * 11/1995 | Higasa et al. | 180/165 |
| 5,472,265 | * 12/1995 | Ohnuma | 303/3 |
| 5,615,933 | * 4/1997 | Kidston et al. | 303/152 |
| 5,632,534 | 5/1997 | Knechtges . | |
| 5,707,115 | * 1/1998 | Bodie et al. | 303/3 |
| 5,788,597 | * 8/1998 | Boll et al. | 477/4 |

FOREIGN PATENT DOCUMENTS 44 35 953 A1  5/1995 (DE) .
6-171489      6/1994 (JP) .

* cited by examiner

Primary Examiner—Robert J. Oberleitner
Assistant Examiner—Bradley King
(74) Attorney, Agent, or Firm—Oliff & Berridge, PLC

(57) ABSTRACT

A vehicle braking system including a frictional braking device for applying a frictional braking torque to each of a plurality of wheels of the vehicle, a regenerative braking device including at least one electric motor for applying a regenerative braking torque to at least one drive wheel of the vehicle, and a total braking torque control device for controlling a total braking torque including one or both of the regenerative braking torque and the frictional braking torque which are applied to each of the wheels. When the total braking torque of at least one of the wheels has exceeded an upper limit corresponding to a friction coefficient of a road surface on which the motor vehicle is running, the total braking torque control device operates to zero the regenerative braking torque of each of the above-indicated at least one wheel and control the frictional braking torque of this wheel while reducing an influence of the zeroing of the regenerative braking torque.

17 Claims, 13 Drawing Sheets

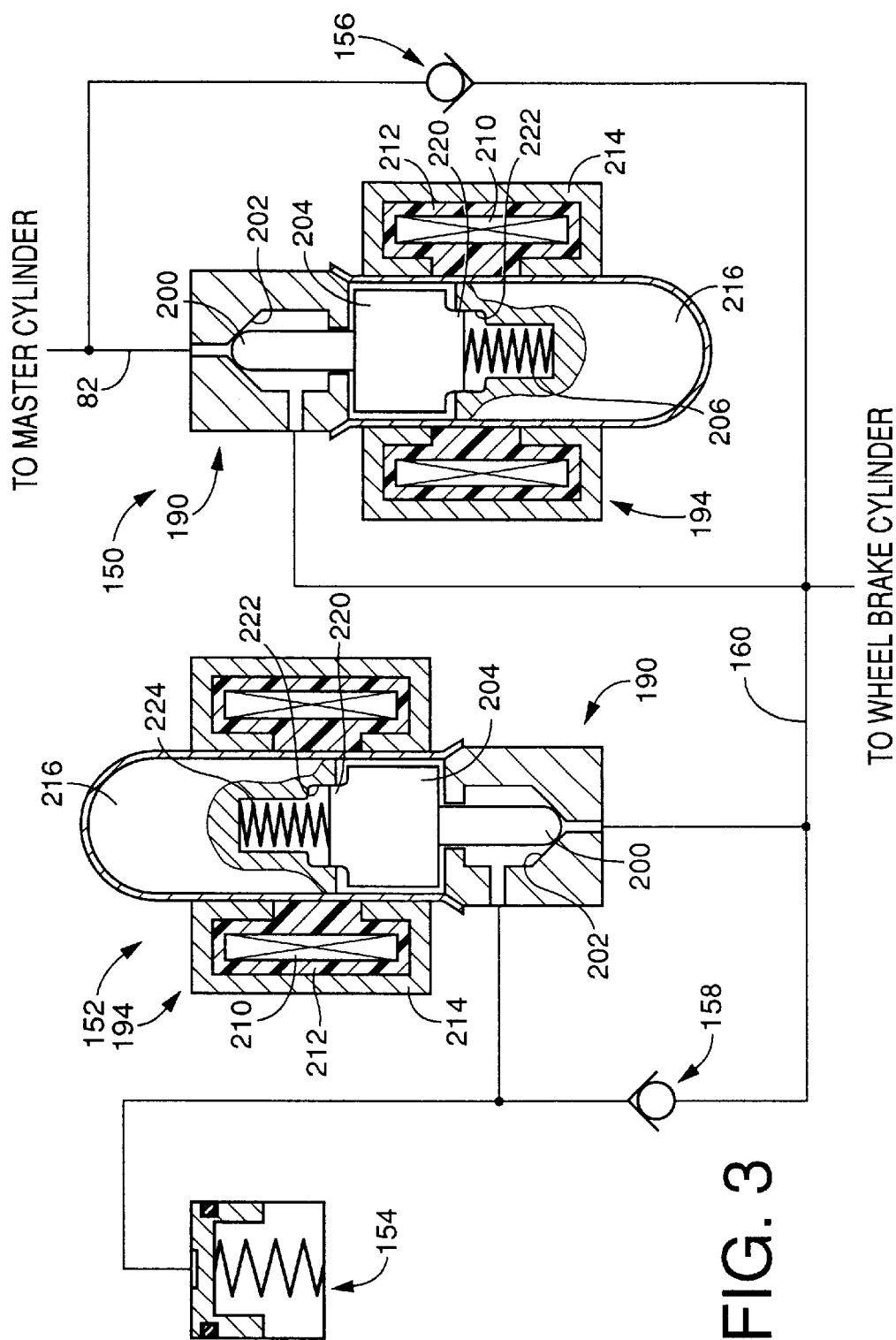

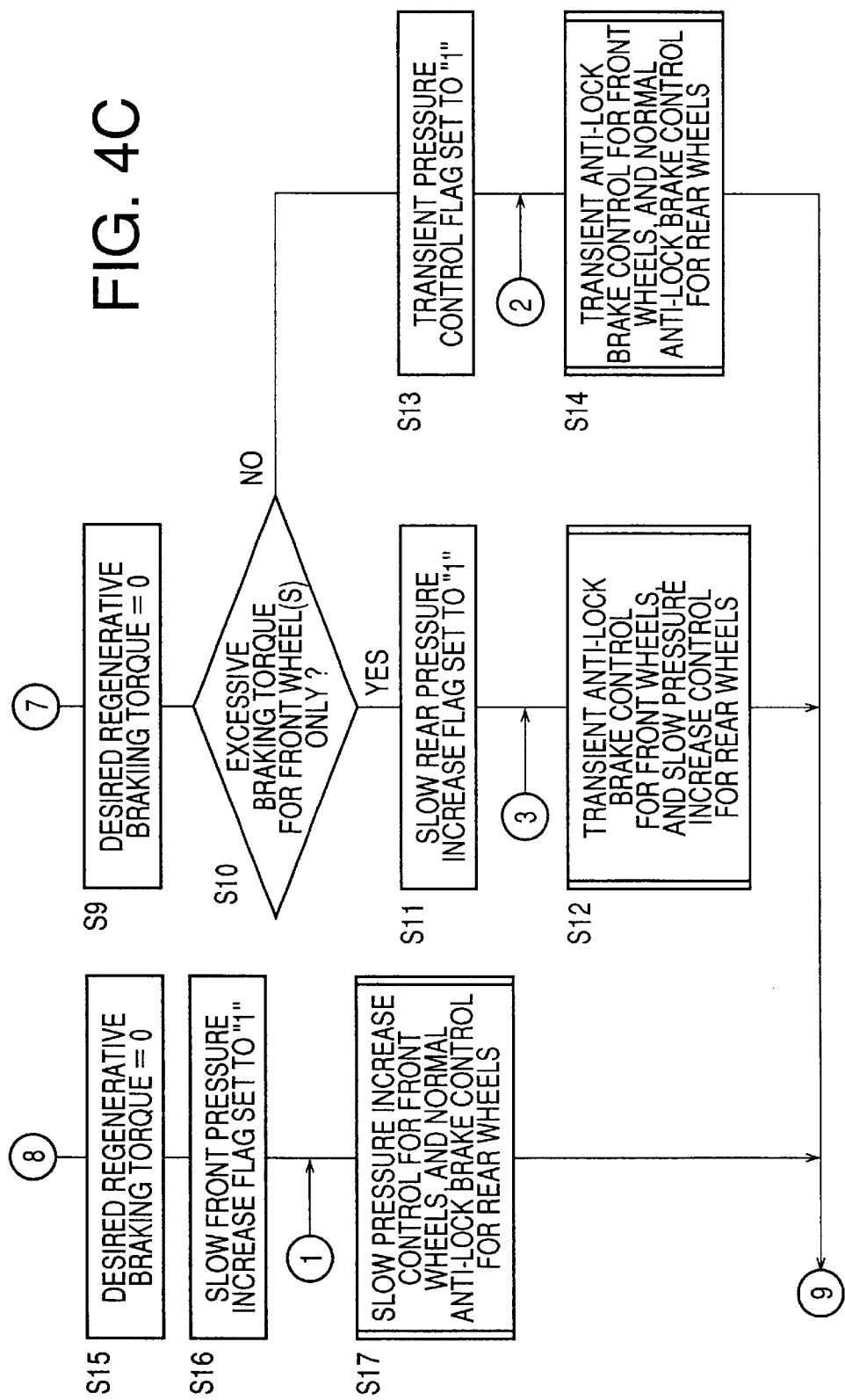

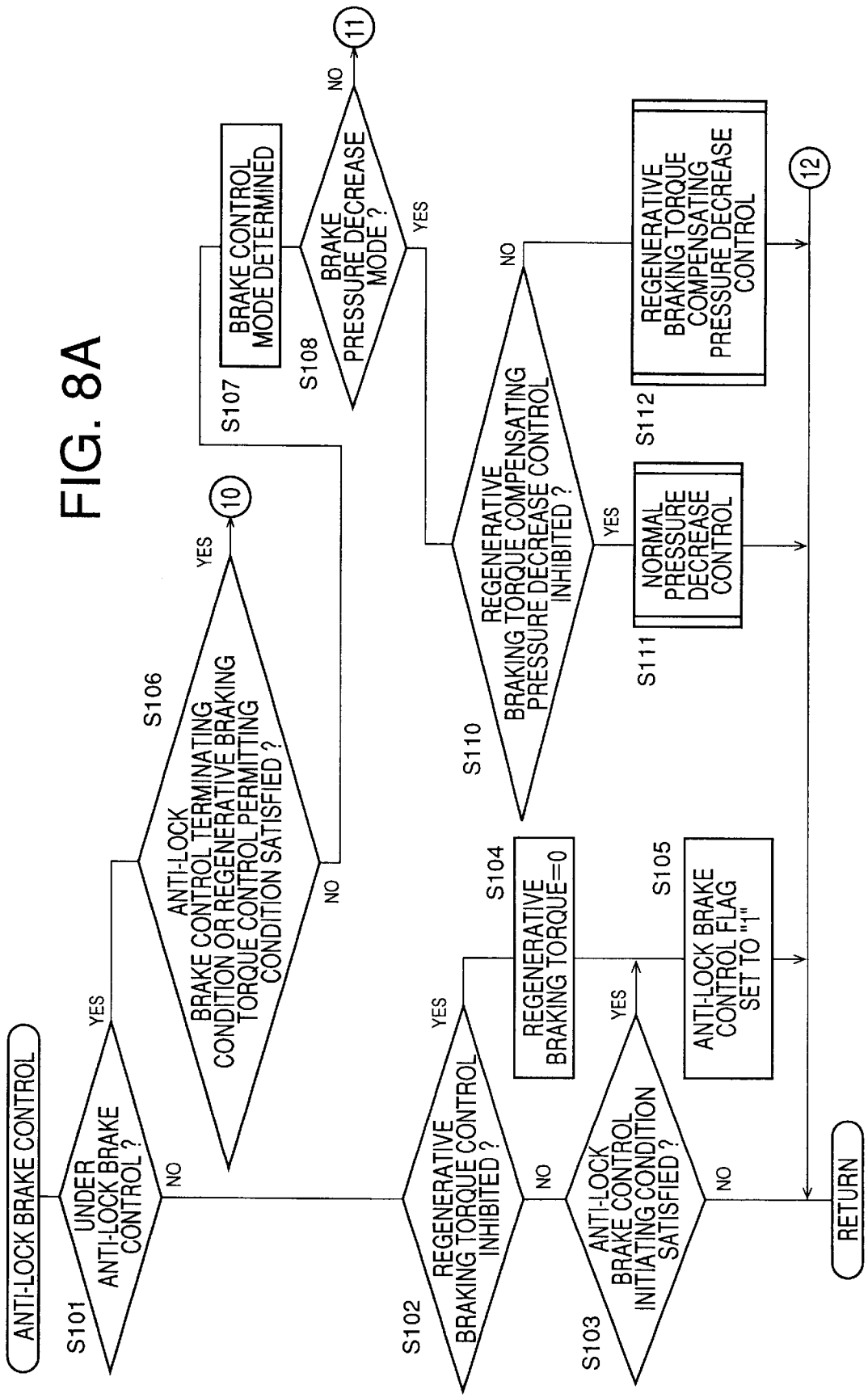

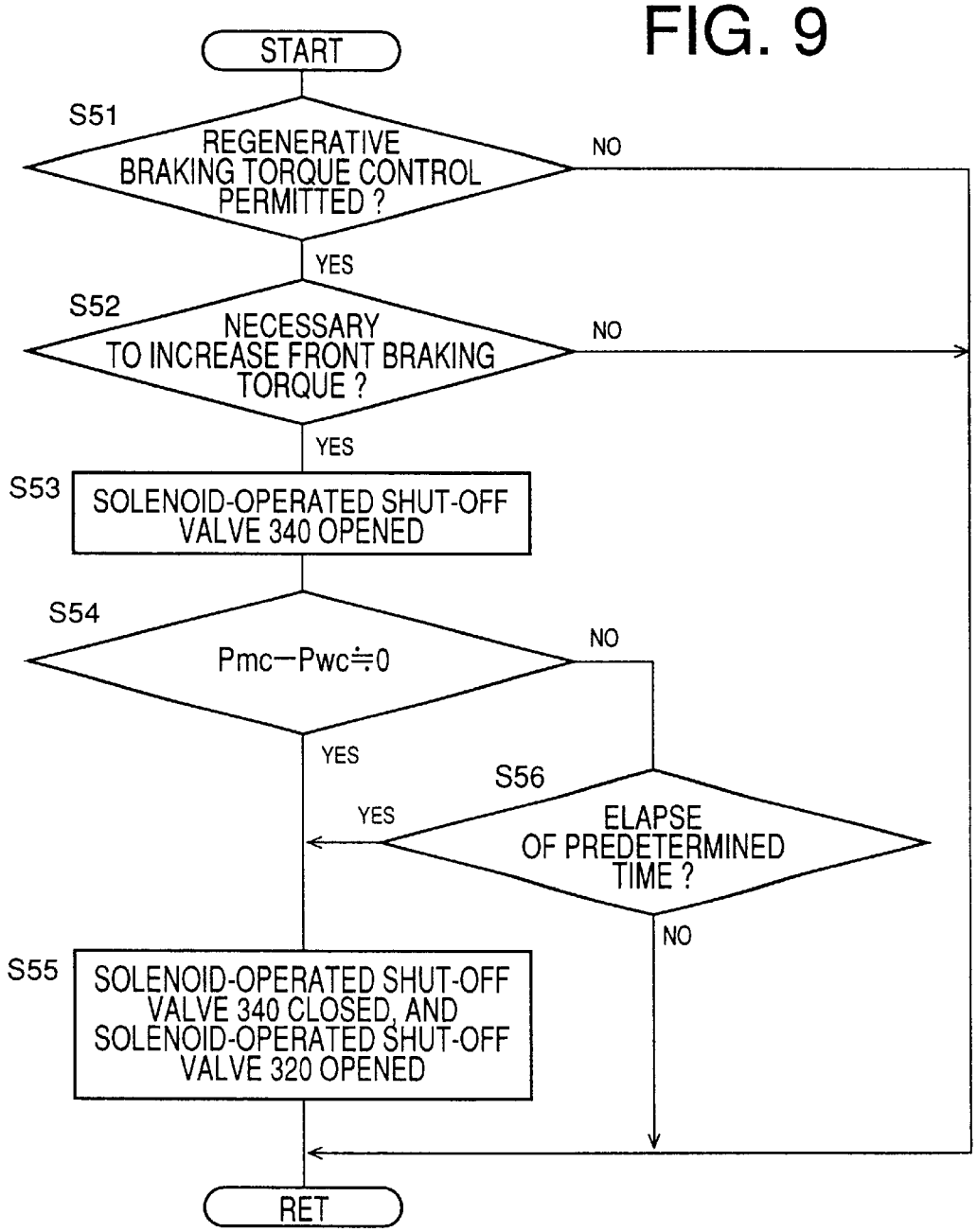

VEHICLE BRAKING SYSTEM HAVING FRICTIONAL AND REGENERATIVE BRAKING DEVICES

This application is based on Japanese Patent Application No. 9-250546 filed Sep. 16, 1997, the content of which is incorporated hereinto by reference.

BACKGROUND OF THE INVENTION

1. Field of the Invention

The present invention relates to a braking system for a motor vehicle, which includes both of a frictional braking device and a regenerative braking device.

2. Discussion of the Related Art

An example of a vehicle braking system of the type indicated above is disclosed in JP-A-6-171489. The frictional braking device is arranged to apply a frictional braking torque to each of a plurality of wheels of the vehicle, by frictional engagement of a friction member with a rotor which rotates with the wheel. On the other hand, the regenerative braking device is arranged to apply a regenerative braking torque to at least one drive wheel of the vehicle, by regenerative braking by at least one electric motor connected to the above-indicated at least one drive wheel. In the vehicle braking system including both of these frictional and regenerative braking devices, each of the wheels is braked with a total braking torque which includes at least one of the frictional braking torque and the regenerative braking torque. When the total braking torque of a given wheel has exceeded an upper limit corresponding to a friction coefficient of a road surface, the frictional braking device for that wheel is controlled in an anti-lock fashion, so that the frictional braking torque is controlled so as to hold the wheel in a substantially optimum slipping state, while the regenerative braking torque is held zero.

In the vehicle braking system disclosed in the above-identified publication, the anti-lock control of the frictional braking device for the drive wheel has a problem such as insufficiency of the total braking torque due to zeroing of the regenerative braking torque.

SUMMARY OF THE INVENTION

It is therefore an object of the present invention to provide a braking system for a motor vehicle, which includes a frictional braking device and a regenerative braking device and which is adapted to reduce an influence of the zeroing of the regenerative braking torque during an anti-lock control of the frictional braking device.

The above object may be achieved according to any one of the following modes of the present invention, each of which is numbered like the appended claims and may refer back to the other mode or modes, as needed, so as to indicate possible combinations of elements or features in preferred forms of the present invention.

(1) A braking system for a motor vehicle having a plurality of wheels which include at least one drive wheel, comprising: a frictional braking device for forcing a friction member onto a rotor rotating with each of the wheels, to thereby apply a frictional braking torque to the each wheel; a regenerative braking device including at least one electric motor which is connected to the above-indicated at least one drive wheel, to apply a regenerative braking torque to the above-indicated at least one drive wheel; and total braking torque control means for controlling a total braking torque including at least one of the regenerative braking torque and the frictional braking torque which are applied to each of the plurality of wheels, the total braking torque control means operating, when the total braking torque applied to each of at least one of the plurality of wheels has exceeded an upper limit corresponding to a friction coefficient of a road surface on which the vehicle is running, for zeroing the regenerative braking torque of each of the above-indicated at least one wheel and controlling the frictional braking torque of each of the above-indicated at least one wheel while reducing an influence of the zeroing of the regenerative braking torque.

In the vehicle braking system according to this mode of the present invention, the regenerative braking torque applied to each drive wheel whose total braking torque has exceeded the upper limit is zeroed, and the frictional braking torque of that wheel is controlled so as to reduce the influence of the zeroing of the regenerative braking torque. The influence caused by the zeroing of the regenerative braking torque includes insufficiency of the total braking torque of the drive wheel where an anti-lock control of the frictional braking device is effected for the drive wheel, and an abrupt increase of the frictional braking torque for the non-anti-lock-controlled wheel which is not subjected to the anti-lock control. The total braking torque control means is operated to reduce these kinds of influence of the zeroing of the regenerative braking torque.

The insufficiency of the total braking torque of the drive wheel can be reduced by reducing the amount of decrease of the frictional braking torque or increasing the rate or gradient of increase of the frictional braking torque during the anti-lock control of the frictional braking device, as compared with that in an anti-lock brake control in a vehicle braking system which does not include a regenerative braking device, or as compared with that in a normal anti-lock control of the frictional braking device which is effected when the regenerative braking torques of all of the wheels are zero. Since the total braking torque of the drive wheel is reduced by the zeroing of the regenerative braking torque, it is desirable to control the frictional braking torque such that the frictional braking torque is larger than in the normal anti-lock control, so that the drive wheel is held in a substantially optimum slipping state. In this arrangement wherein the frictional braking torque of the drive wheel during the anti-lock control is controlled to be relatively large, the total braking torque control means is considered to include the anti-lock control means adapted to reduce or limit the braking torque or anti-lock control means adapted to effect an anti-lock control for the drive wheel.

(2) A braking system according to the above mode (1), wherein the frictional braking device includes (a) a common controller for commonly controlling the frictional braking torques of the plurality of wheels, and (b) independent controllers for controlling the frictional braking torques of the plurality of wheels, respectively, independently of each other, and the total braking torque control means includes (c) cooperative control means for controlling the common controller such that a sum of the frictional braking torque and the regenerative braking torque coincides with a desired braking torque value desired by an operator df the motor vehicle, and (d) anti-lock control means for controlling the independent controllers such that the frictional braking torque of each wheel controlled by a corresponding one of the independent controllers permits each wheel to be held in a substantially optimum slipping state.

In the above mode (2) of the present invention, the frictional braking torques of all of the plurality of wheels are increased when the regenerative driving torque is zeroed when the total braking torque applied to at least one of the wheels has exceeded the upper limit. Further, the frictional braking torque of each wheel whose total braking torque has exceeded the upper limit is controlled by the anti-lock control means. Accordingly, the total braking torque of the non-anti-lock-controlled wheel or wheels whose frictional braking torque is not controlled by the anti-lock control means is abruptly or rapidly increased. Where the non-anti-lock-controlled wheel is the non-drive wheel, the frictional braking torque of that non-drive wheel to which the regenerative braking torque has not been applied is rapidly increased by the common controller and the cooperative control means, by an amount equal to the regenerative braking torque which has been applied to the drive wheel. As a result, the running stability of the vehicle is deteriorated, or the anti-lock control of the frictional braking device is initiated for the non-anti-lock-controlled wheel, at an earlier point of time than required. On the other hand, the rapid increase of the total braking torque of the non-anti-lock-controlled wheel due to the zeroing of the regenerative braking torque can be prevented if the rate or gradient at which the frictional braking torque of the non-anti-lock-controlled wheel is increased is restricted or restrained by the independent controller. In this case, the frictional braking torque (or the total braking torque) of the non-anti-lock-controlled wheel can be considered to be slowly or gradually increased by slow torque increasing means, which controls the independent controller corresponding to the non-anti-lock-controlled wheel. It is possible to consider that the independent controller is controlled by torque increase gradient restricting means for restricting the gradient of increase of the frictional braking torque.

Where the non-anti-lock-controlled wheel is the drive wheel, the frictional braking torque of the drive wheel is increased by an amount equal to the regenerative braking torque which has been applied thereto and which has been zeroed. Therefore, the total braking torque applied to that drive wheel remains unchanged before and after the regenerative braking torque is zeroed. Actually, however, the total braking torque may be temporarily rapidly increased because the rate of increase of the frictional braking torque is higher than the rate of decrease of the regenerative braking torque to zero.

The wheel whose total braking torque has exceeded the upper limit may be the drive wheel or the non-drive wheel. In either case, the regenerative braking torque of the drive wheel may be zeroed. Alternatively, the regenerative braking torque of the drive wheel is zeroed only where its total braking torque has exceeded the upper limit, and is not zeroed where the total braking torque of the non-drive wheel has exceeded the upper limit.

(3) A braking system according to the above mode (1) or (2), wherein the total braking torque control means includes braking torque control means comprising at least one of (1) drive-wheel anti-lock control means for controlling the frictional braking torque applied to each of the above-indicated at least one drive wheel whose total braking torque has exceeded the upper limit, so as to hold each of the above-indicated at least one drive wheel in a substantially optimum slipping state while restricting a decrease of the total braking torque due to the zeroing of the regenerative braking torque, and (2) frictional torque increase gradient restricting means for restricting a gradient of increase of the frictional braking torque of at least one of the plurality of wheels except the above-indicated at least one wheel whose total braking torque has exceeded the upper limit.

Where the total braking torque control means includes the drive-wheel anti-lock control means, the frictional braking torque applied to each drive wheel whose total braking torque has exceeded the upper limit is controlled so as to hold the drive wheel in a substantially optimum slipping state and so as to restrict a decrease of the total braking torque of the drive wheel.

Where the total braking torque control means includes the frictional torque increase gradient restricting means, the frictional braking torque of the non-anti-lock-controlled wheel is increased upon zeroing of the regenerative braking torque, but the rate or gradient of increase of the frictional braking torque is restricted or restrained.

(4) A braking system for a motor vehicle having a plurality of wheels which include at least one drive wheel, comprising: a frictional braking device for forcing a friction member onto a rotor rotating with each of the wheels, to thereby apply a frictional braking torque to the each wheel; a regenerative braking device including at least one electric motor which is connected to the above-indicated at least one drive wheel, to apply a regenerative braking torque to the above-indicated at least one drive wheel; and total braking torque control means for controlling a total braking torque applied to each of said plurality of wheels, said total braking torque including at least one of the frictional braking torque and the regenerative braking torque, and wherein the total braking torque control means includes first anti-lock control means for controlling the total braking torque applied to each of at least one of the plurality of wheels, so as to hold the each of the above-indicated at least one wheel in a substantially optimum slipping state, when the total braking torque applied to each of the above-indicated at least one wheel has exceeded an upper limit corresponding to a friction coefficient of a road surface on which the motor vehicle is running, while one of the regenerative braking torque and the frictional braking torque of the total braking torque applied to the plurality of wheels is zero, and braking torque control means for controlling the total braking torques applied to the plurality of wheels when the total braking torque applied to each of at least one of the plurality of wheels has exceeded the upper limit while none of the regenerative braking torque applied to each drive wheel and the frictional braking torque applied to said plurality of wheels are zero, the braking torque control means including (1) regenerative braking torque reducing means for zeroing the regenerative braking torque, and (2) at least one of (a) second anti-lock control means for controlling the frictional braking torque of each of the above-indicated at least one driving wheel whose total braking torque has exceeded the upper limit, so as to hold each of the above-indicated at least one driving wheel in a substantially optimum slipping state and such that the frictional braking torque controlled by the second anti-lock control means is generally larger than that controlled by the first anti-lock control means, and (b) frictional braking torque increase gradient restricting means for restricting a gradient of increase of the frictional braking torque of at least one of the plurality of wheels except the above-indicated at least one wheel whose total braking torque has exceeded the upper limit.

When the total braking torque of at least one of the wheels has exceeded the upper limit while one of the regenerative braking torque and the frictional braking torque is zero, the non-zeroed regenerative or frictional braking torque (total braking torque) of the wheel whose total braking torque has exceeded the upper limit is controlled by the first anti-lock control means. When the total braking torque of at least one of the wheels has exceeded the upper limit while neither the regenerative braking torque nor the frictional braking torque of each wheel whose total braking torque has exceeded the upper limit is zero, the regenerative braking torque of that wheel is zeroed by the regenerative braking torque reducing means, and the total braking torque of at least one of the plurality of wheels are controlled by the braking torque control means.

The regenerative braking torque reducing means may be adapted to either rapidly or gradually reduce the regenerative braking torque to zero.

(5) A braking system according to the above mode (4), wherein the braking torque control means includes both of the second anti-lock control means and the frictional braking torque increase gradient restricting means.

(6) A braking system according to the above mode (4), wherein the braking torque control means includes the second anti-lock control means or the frictional braking torque increase gradient restricting means.

The influence of the zeroing of the regenerative braking torque can be reduced by the provision of either one of the second anti-lock control means and the frictional braking torque increase gradient restricting means. Where both of the second anti-lock control means and the frictional braking torque increase gradient restricting means are provided, these two means may be operated either concurrently or at different times. However, the influence of the zeroing of the regenerative braking torque can be more quickly reduced when the two means are concurrently operated.

Where the wheel whose total braking torque has exceeded the upper limit is the drive wheel, the frictional braking torque is controlled by the second anti-lock control means, such that the frictional braking torque controlled by the second anti-lock control means is generally larger than that controlled by the first anti-lock control means. For instance, the second anti-lock control means may be adapted to reduce the amount of decrease of the frictional braking torque or increase the rate or gradient of increase of the frictional braking torque. It is not necessary to effect both of the reduction of the amount of decrease and the increase of the gradient of increase of the frictional braking torque. It is sufficient to effect either of these reduction and increase.

The total regenerative braking torque of the drive wheel becomes insufficient if the frictional braking torque of the drive wheel is controlled by the first anti-lock control means upon zeroing of the regenerative braking torque of the drive wheel. However, the second anti-lock control means controls the frictional braking torque so that the frictional braking torque is larger than when it is controlled by the first anti-lock control means. Therefore, the second anti-lock control means is effective to suitably prevent the insufficiency of the total braking torque of the drive wheel.

The amount of decrease of the frictional braking torque can be reduced, for example, by shortening the time duration for which the frictional braking torque is decreased. Where the frictional braking torque is decreased by alternately decreasing and holding the frictional braking torque, the amount of decrease of the frictional braking torque can be reduced by reducing the ratio of the time duration for which the frictional braking torque is decreased, to the time duration for which the frictional braking torque is held constant. In the latter case, the amount of decrease can be reduced by reducing the ratio of the decreasing time duration to the sum of the decreasing and holding time durations. The time required for reducing the amount of decrease of the frictional braking torque can be reduced by changing the decreasing operation to the holding or increasing operation at a relatively early point of time. Where the decreasing operation to decrease the frictional braking torque is changed to the holding or increasing operation to hold or increase the frictional braking torque when the acceleration value of the vehicle has exceeded a predetermined threshold, for instance, the above change can take place at a relatively early point of time by reducing the threshold. Further, the rate of decrease of the frictional braking torque can be lowered by increasing the above-indicated ratio of the decreasing time duration to the holding time duration, and the rate of increase can be increased by increasing the ratio of the increasing time duration. It is possible to increase the amount of increase of the frictional braking torque as well as the rate of increase.

The amount of decrease and the rate of increase of the frictional braking torque may be determined depending upon the regenerative braking torque immediately before the regenerative braking torque is zeroed. The amount of decrease and the rate of increase by the first anti-lock control means can be compensated depending upon the regenerative braking torque immediately before the zeroing of the regenerative braking torque. In this case, the compensating amounts of the amount of decrease and the rate of increase are determined depending upon the regenerative braking torque immediately before the zeroing. The compensating amounts may also be determined on the basis of a time lapse after the initiation of the control by the second anti-lock control means. The compensating amounts are decreased with an increase in the time lapse, since the influence of the zeroing of the regenerative braking torque decreases as the time lapses after the initiation of the control by the second anti-lock control means.

As described above, where the wheel whose total braking torque has exceeded the upper limit is the drive wheel, the amount of decrease of the frictional braking torque is reduced by the second anti-lock control means, and/or the rate or gradient of increase of the frictional braking torque control means is increased by the anti-lock control means. Thus, the second anti-lock control means is considered to include at least one of decrease amount restricting means for restricting or restraining the amount of decrease of the frictional braking torque and increase gradient increasing means for increasing the gradient of increase of the frictional braking torque. Where the amount of decrease and the gradient of increase are determined by compensating the amount of decrease and the gradient of increase of the frictional braking torque by the first anti-lock control means, the second anti-lock control means is considered to include decrease amount compensating means for compensating the amount of decrease by the first anti-lock control means, and increase gradient compensating means for compensating the gradient of increase by the first anti-lock control means. Where the compensating amounts are determined on the basis of at least one of the prior regenerative braking torque and the above-indicated time lapse, the second anti-lock control means is considered to include means for determining the compensating amounts corresponding to the prior regenerative braking torque, and means for determining the compensating amounts corresponding to the time lapse.

On the other hand, the gradient of increase of the frictional braking torque of the non-anti-lock-controlled wheel whose total braking torque has not exceeded the upper limit is controlled by the frictional torque increase gradient restricting means. If the gradient of increase of the frictional braking torque is controlled depending upon the prior regenerative braking torque immediately before the zeroing, the frictional braking torque can be increased at a gradient determined by the amount of change of the frictional braking torque.

Since the frictional braking torque increase gradient restricting means is operated before the anti-lock control is initiated, this means may be called pre-anti-lock-control gradient restricting means.

(7) A braking system according to the above mode (4), wherein the total braking torque control means includes switching means for disabling the second anti-lock control means and enabling the first anti-lock control means.

(8) A braking system according to the above mode (7), wherein the switching means disables the second anti-lock control means and enables the first anti-lock control means when a predetermined condition is satisfied.

The braking torque control means includes at least one of the second anti-lock control means and the frictional braking torque increase gradient restricting means, as described above. The switching means may be operated to disable the second anti-lock control means and enable the first anti-lock control means when at least one of conditions for terminating operations of the second anti-lock control means and the frictional braking torque increase gradient restricting means is satisfied. However, the switching means may be operated when any other condition is satisfied.

The predetermined condition indicated above may be satisfied when the influence of the zeroing of the regenerative braking torque is sufficiently reduced. For instance, the predetermined condition includes at least one of: a condition (A) that the total braking torque of the drive wheel whose regenerative braking torque has been zeroed by the regenerative braking torque reducing means and whose frictional braking torque is controlled by the second anti-lock control means has been increased by a first amount sufficient to compensate for an amount of reduction of the total braking torque caused by the zeroing of the regenerative braking torque; a condition (B) that the frictional braking torque of the wheel whose total braking torque is not controlled by the braking torque control means has increased by a second amount substantially equal to the total braking torque before the regenerative braking torque is zeroed; and a condition (C) that the influence of the regenerative braking torque on the anti-lock control of the frictional braking device has been reduced.

The condition (A) may be satisfied when a predetermined number of operations of the second anti-lock control means to decrease the frictional braking torque and/or a predetermined number of operations of the second anti-lock control means to increase the frictional braking torque has/have been performed. In this case, the predetermined number or numbers of operations of the second anti-lock control means to restrict the amount of decrease or increase the gradient of increase of the frictional braking torque is/are determined so as to eliminate the insufficiency of the total braking torque of the drive wheel.

The condition (B) may be satisfied when the frictional braking torque of the drive wheel has been increased by an amount equal to the regenerative braking torque which has been zeroed. After the total braking torque has been increased to a value almost equal to the value before the regenerative braking torque is zeroed, the anti-lock control of the drive wheel by the second anti-lock control means is no longer required.

The condition (C) may be satisfied when a predetermined time has passed after the regenerative braking torque has been zeroed. Usually, the condition for initiating the anti-lock brake control or the condition for selecting the braking torque decrease mode is satisfied, when a certain time has passed after the regenerative braking torque has been zeroed. This phenomenon appears to be derived from a change in the frictional braking torque during this time period. Accordingly, it can be considered that the frictional braking torque is no longer required to be controlled by the second anti-lock control means after the predetermined time has passed after the zeroing of the regenerative braking torque. In other words, the predetermined time should be determined to be long enough so that the influence of the zeroing of the regenerative braking torque has been eliminated during the predetermined time. It is preferred to determine that the actual regenerative braking torque has been zeroed when the actual regenerative braking torque as represented by appropriate information such as the operating speed of the electric motor of the regenerative braking device has been reduced to a predetermined threshold. The actual regenerative braking torque as represented by the appropriate information may be larger than zero even when the actual regenerative braking torque is in fact zero, since a noise may be included in the information. The regenerative braking device may be adapted to supply the total braking torque control means with different signals (high-level and low-level signals) when the actual regenerative braking torque is larger and not larger than a predetermined threshold, respectively. In this case, the total braking torque control means determines that the actual regenerative braking torque is zero or too small to have an influence on the anti-lock brake control, when the total braking torque control means is supplied with the low-level signal.

Thus, the braking torque control means including the frictional braking torque reducing means and at least one of the second anti-lock control means and the frictional braking torque increase gradient restricting means is operated during a period of transition from a vehicle state in which the regenerative braking torque is applied to the drive wheel to a vehicle state in which the regenerative braking torque is zero and the influence of the zeroing has been sufficiently reduced, namely, from a vehicle state in which the regenerative and frictional braking torques are both applied to the drive wheels, to a vehicle state in which only the frictional braking torque is applied. In this sense, the braking torque control means is considered to be transient total braking torque control means which includes at least one of transient anti-lock control means as the second anti-lock control means and transient frictional braking torque increase gradient restricting means, which are operated during the above-indicated period of transition.

(9) A braking system according to any one of the above modes (1)–(8), wherein the total braking torque control means includes hunting restraining means for restraining a change in the total braking torque of each of the plurality of wheels when hunting of the rotating speed of the wheel is detected.

As described above, the second anti-lock control means is operated to zero the regenerative braking torque and decrease the frictional braking torque. If the amount of decrease of the frictional braking torque is not suitably controlled, the total braking torque is excessively decreased. Then, the frictional braking torque is increased. If the gradient or rate of increase of the frictional braking torque is increased, at least one of the gradient and amount of increase of the total braking torque is increased. Accordingly, at least one of the amount and rate of change of the total braking torque is increased in one cycle of control including the decrease and increase of the frictional braking torque, so that the rotating speed of the wheel in question is likely to suffer from hunting. This hunting may take place before the control cycle is terminated. The hunting may be restrained by reducing the amount or rate of change of the total braking torque by reducing at least one of the amount and gradient of decrease and the amount and gradient of increase of the frictional braking torque when the hunting is detected.

An operation to detect the hunting of the rotating speed of the wheel may be implemented during or after operation of the second anti-lock control means. The hunting restraining means may be activated during the operation of the second anti-lock control means, or after the operation of the second anti-lock control means, for instance, during the subsequent operation of the first anti-lock control means.

Where the operation to detect the hunting is performed during the operation of the second anti-lock control means, the presence of the hunting is detected if the amount of change of the acceleration value of the wheel higher than a predetermined value is detected for a predetermined number of times successively. By reducing at least one of the amount of decrease and the gradient of increase of the frictional braking torque during the operation of the second anti-lock control means, for instance, at least one of the amount and rate of change of the total braking torque can be reduced, to thereby restrain the hunting of the rotating speed of the wheel in question. Where the operation to detect the hunting is performed after the operation of the second anti-lock control means, the hunting can be detected based on the specific operation of the second anti-lock control means. In the case where the second anti-lock control means is operated to effect one operation to decrease the frictional braking torque and one operation to increase the friction braking torque in the pulse number increase mode, for example, the presence of the hunting is detected if the pulse number increase sub-mode is changed to the other sub-mode of the frictional braking torque increase mode before the number of control pulses in the pulse number increase sub-mode has reached a predetermined value. In this case, the hunting of the wheel can be restrained by reducing at least one of the amount and gradient of decrease and the amount and gradient of increase of the frictional braking torque during the subsequent operation of the first anti-lock control means.

The total braking torque control means provided in the present mode (9) of the invention is considered to include means for detecting the presence of the hunting of the rotating speed of the wheel.

This hunting detecting means may be adapted to detect that the wheel is actually suffering from the hunting, or estimate that the wheel is suffering from the hunting, or estimate that there is a high possibility that the wheel is about to suffer from the hunting.

(10) A braking system according to the above mode (9), wherein the total braking torque control means includes inhibiting means for inhibiting the hunting restraining means from restraining a change in the total braking torque while the second anti-lock control means is operated.

As described above, the hunting of the rotating speed of the wheel may occur due to the operation of the second anti-lock control means. To reduce the influence of the zeroing of the regenerative braking torque, however, the operation of the second anti-lock control means is desirably performed in a predetermined normal manner. That is, it is desirable to inhibit the operation of the hunting restraining means during the operation of the second anti-lock control means.

It is also possible to inhibit the operation to detect the hunting or ignore the detection of the actual hunting, while the second anti-lock control means is in operation. In the present mode (10), the total braking torque control means is considered to include means for inhibiting the operation to detect the hunting, or means for ignoring the detection of the hunting.

(11) A braking system according to any one of the above modes (3)–(10), wherein the frictional braking device includes a common controller for commonly controlling the frictional braking torques of the plurality of wheels, and (b) independent controllers for controlling the frictional braking torques of the plurality of wheels, respectively, independently of each other, and the total braking torque control means includes (c) cooperative control means for controlling the common controller such that a sum of the frictional braking torque and the regenerative braking torque coincides with a desired braking torque value desired by an operator of the motor vehicle, and (d) anti-lock control means for controlling the independent controllers such that the frictional braking torque of each of said plurality of wheels controlled by a corresponding one of the independent controllers holding said each wheel in a substantially optimum slipping state, said anti-lock control means including said drive-wheel anti-lock control means.

As described above with respect to the above mode (2), the common controller is controlled by the cooperative control means such that the sum of the frictional and regenerative braking torques coincides with the required braking torque, while the independent controllers are controlled by the anti-lock control means, so as to hold the wheel in a substantially optimum slipping state. Upon zeroing of the regenerative braking torque, the frictional braking torques of the drive wheels and the non-drive wheels are rapidly increased by the common controller in the same manner. The frictional torque of the wheel which is subjected to an anti-lock brake control is controlled by the independent controller, while the frictional braking torque of the wheel which is not subjected to the anti-lock brake control is rapidly increased.

In the braking system according to the present mode (11), the point of time at which the anti-lock brake control is initiated for the non-anti-lock-controlled wheel which is not currently subjected to the anti-lock brake control can be delayed, and the deterioration of the vehicle running stability can be reduced, by restricting or restraining the rate or gradient of increase of the frictional braking torque for the non-anti-lock-controlled wheel, rather than rapidly increasing it.

(12) A braking system for a motor vehicle having a plurality of wheels which include at least one drive wheel, the braking system comprising a frictional braking device for forcing a friction member onto a rotor rotating with each of the wheels, to thereby apply a frictional braking torque to the each wheel, and first anti-lock control means for controlling the frictional braking torque applied to each of at least one of the plurality of wheels, so as to hold the each of the above-indicated at least one wheel in a substantially optimum slipping state, when the frictional braking torque applied to the each of the above-indicated at least one wheel has exceeded an upper limit corresponding to a friction coefficient of a road surface on which the motor vehicle is running, the braking system being characterized by further comprising: a regenerative braking device including at least one electric motor which is connected to the above-indicated at least one drive wheel, to apply a regenerative braking torque to the above-indicated at least one drive wheel; and total braking torque control means for controlling a total braking torque including at least one of the frictional braking torque and the regenerative braking torque which are applied to each of the plurality of wheels, when the total braking torque applied to at least one of the plurality of wheels has exceeded the upper limit while none of the regenerative braking torque applied to the at least one drive wheel and the frictional braking torque applied to the plurality of wheels are zero, the total braking torque control means including (1) regenerative braking torque reducing means for zeroing the regenerative braking torque, and (2) at least one of (a) second anti-lock control means for controlling the frictional braking torque of each of the above-indicated at least one driving wheel whose total braking torque has exceeded the upper limit, so as to hold the each of the above-indicated at least one driving wheel in a substantially optimum slipping state and such that the frictional braking torque controlled by the second anti-lock control means is generally larger than that controlled by the first anti-lock control means, and (b) frictional braking torque increase gradient restricting means for restricting a gradient at which the frictional braking torque of at least one of the plurality of wheels except the above-indicated at least one wheel whose total braking torque has exceeded the upper limit.

In the braking system according to this mode (12) of the present invention, the regenerative braking torque of the drive wheel is necessarily zeroed if the total braking torque of this drive wheel has exceeded the upper limit corresponding to the friction coefficient of the road surface. Where the wheel whose total braking torque has exceeded the upper limit is the non-drive wheel, the regenerative braking torque of the drive wheel may or may not be zeroed. When the regenerative braking torque is zeroed, the second anti-lock control means controls the frictional braking torque of the wheel (drive wheel) whose total braking torque has exceeded the upper limit, so that this drive wheel is held in a substantially optimum slipping state, and the frictional braking torque increase gradient restricting means restricts the rate or gradient of increase of the frictional braking torque of the wheel whose total braking torque has not exceeded the upper limit.

The present braking system may utilize anti-lock control means used in a conventional bra-king system not equipped with a regenerative braking device.

BRIEF DESCRIPTION OF THE DRAWINGS

The above and other objects, features, advantages and technical and industrial significance of the present invention will be better understood by reading the following detailed description of presently preferred embodiments of the invention, when considered in conjunction with the accompanying drawings, in which:

FIG. 3 is a fragmentary elevational view in cross section of a linear solenoid valve device included in the hydraulically operated braking device of FIG. 2;

FIGS. 4A–4D are flow charts illustrating a total braking torque control program stored in a ROM of a total braking torque controller included in the hydraulically operated braking device;

FIGS. 8A–8B are flow charts is a flow chart illustrating a hydraulic braking torque control program stored in a ROM of a hydraulic braking torque controller included in the braking system of FIG. 5; and FIG. 9 is a flow chart illustrating a program for controlling a front wheel pressure increasing device, which is stored in the hydraulic braking torque controller.

DETAILED DESCRIPTION OF THE PREFERRED EMBODIMENTS

Figure 1:
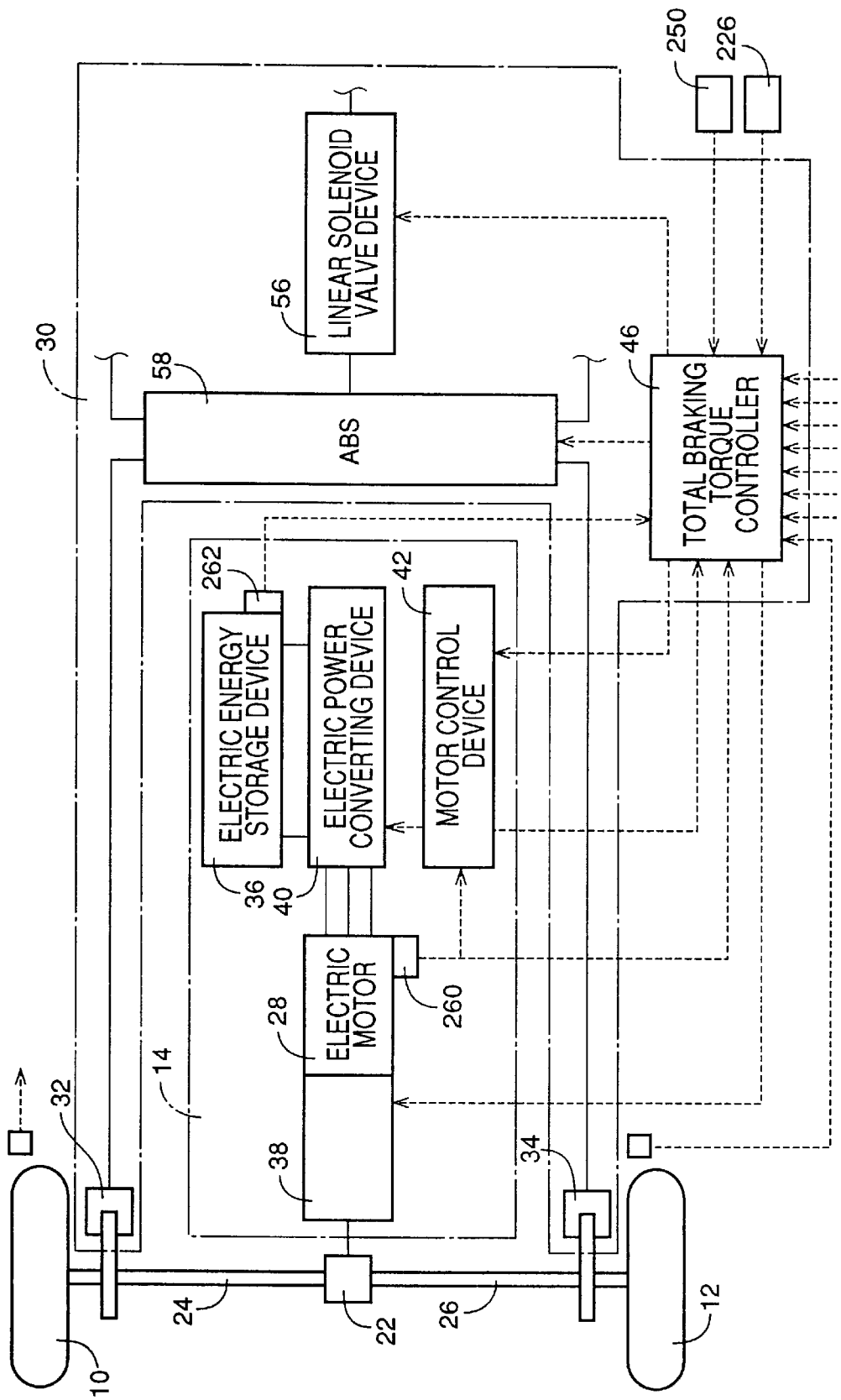
FIG. 1 is a schematic view showing a general arrangement of a braking system of a motor vehicle constructed according to one embodiment of this invention.

Referring first to FIG. 1, there is shown one embodiment of a braking system of the present invention, for use on a hybrid motor vehicle wherein front wheels 10, 12 provided as drive wheels are driven by an electric drive device 14 and an internal combustion drive device such as an engine as well known in the art. The electric drive device 14 is operatively connected to the front wheels 10, 12 through a differential device 22 and respective drive shafts 24, 26. The electric drive device 14 also functions as a regenerative braking device for applying a regenerative braking torque to the front wheels 10, 12 by regenerative braking by an electric motor 28. The present vehicle braking system further includes a frictional braking device in the form of a hydraulically operated braking device 30, which has rotors rotating with the front wheels 10, 12, friction members in the form of friction members, wheel brake cylinders 32, 34 which are hydraulically actuated to effect frictional engagement of the friction pads with the rotors, for thereby applying a hydraulic braking torque to each front wheel 10, 12.

Thus, each front wheel 10, 12 is braked with a total braking torque which is a sum of the regenerative braking torque produced by the regenerative braking device 14 and the hydraulic braking torque produced by the hydraulically operated braking device 30.

The regenerative braking device 14 includes, an electric energy storage device 36, a speed changing device 38, an electric power converting device 40 and a motor control device 42, in addition to the above-indicated electric motor 28. When a drive shaft of the electric motor 28 is rotated by the wheels 10, 12 during running of the vehicle, the electric energy storage device 36 is charged with an electromotive force (hereinafter referred to as "regenerative electromotive force") generated by the electric motor 28. At this time, the electric motor 28 acts as a load, thereby generating a regenerative braking torque to be applied to the vehicle. The electric power converting device 40 serves to convert a direct current of an electric energy stored in the storage device 36, into an alternating current to be applied to the electric motor 28. The electric power converting device 40 includes an inverter, and is controlled by the motor control device 42, which is adapted to effect slip frequency control and current control (e.g., vector control) in the inverter, for controlling the braking torque and the driving torque which are generated by the electric motor 28, so that these regenerative braking torque and driving torque to be applied to the wheels 10, 12 are controlled. The driving torque is controlled to a value determined on the basis of an operating state of an accelerator pedal provided on the vehicle.

The regenerative braking torque can be controlled also by the speed changing device 38 which is arranged to change the speed ratio at which the rotation of the wheels 10, 12 is transmitted to the electric motor 28. Since the rotating speed of the drive shaft of the electric motor 28 can be changed by changing the speed ratio, the amount of the regenerative braking torque can be changed.

Figure 2:
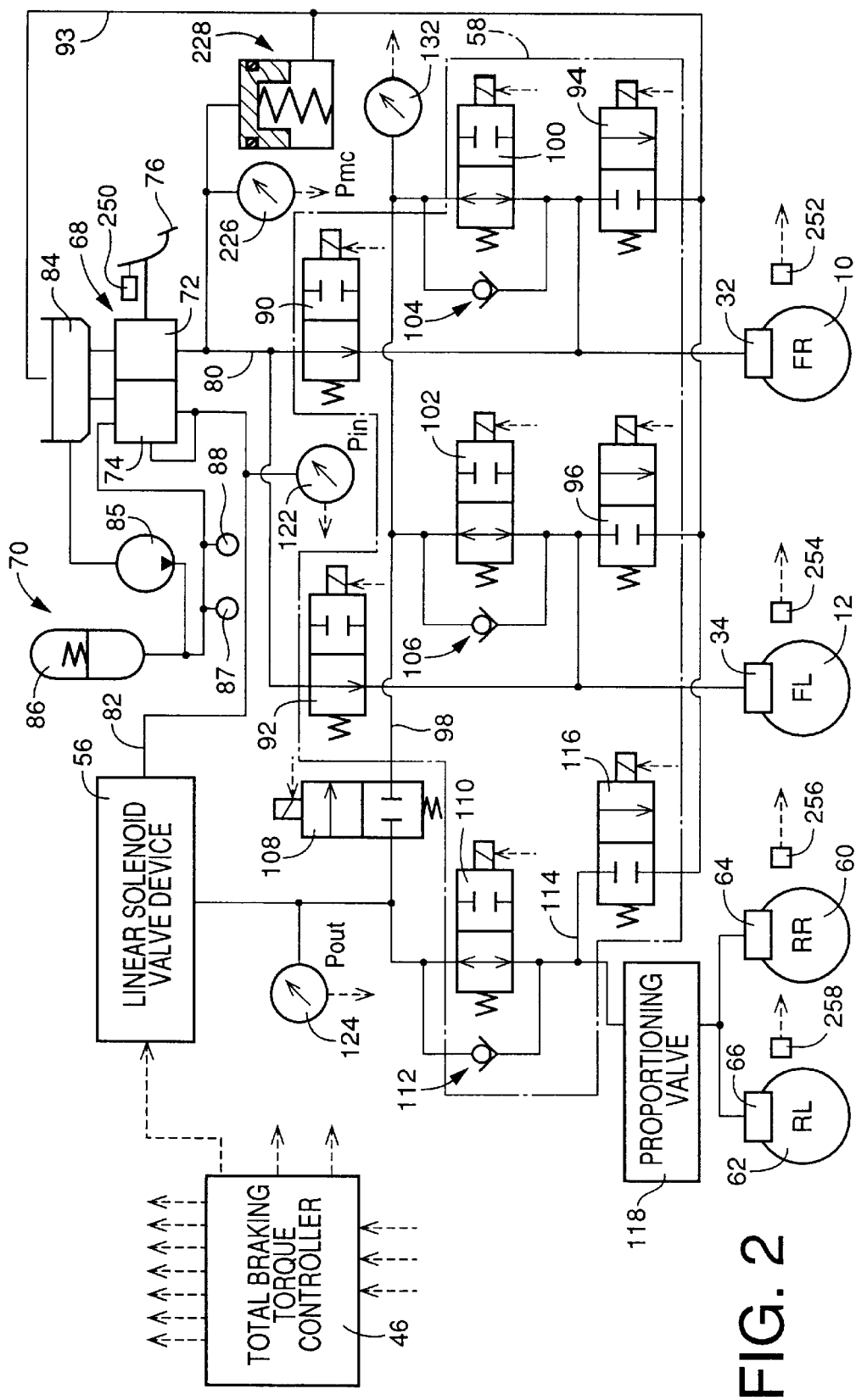
FIG. 2 is a diagram showing a hydraulically operated braking device included in the braking system of FIG. 1.

The hydraulically operated braking device 30 includes the above-indicated wheel brake cylinders 32, 34 for the front wheels 10, 12, a total braking torque controller 46, a linear solenoid valve device 56 and an anti-lock controller 58, as shown in FIG. 1, and further includes wheel brake cylinders 64, 66 for respective rear wheels 60, 62, a master cylinder 68 and a constant hydraulic pressure source 70, as shown in FIG. 2. The total braking torque controller 46 is adapted to control the hydraulic braking torque, and the total braking torque which is equal to the regenerative braking torque plus the hydraulic braking torque, as indicated above.

The master cylinder 68 has two pressurizing chambers 72, 74. A working fluid in these two pressurizing chambers 72, 74 is pressurized to the same level in the two chambers 72, 74, depending upon an operating force acting on a brake pedal 76. The pressurizing chamber 72 is connected through a fluid passage 80 to the wheel brake cylinders 32, 34 of the front wheels 10, 12, while the other pressurizing chamber 74 is connected through a fluid passage 82 to the wheel brake cylinders 64, 66 for the rear wheels 60, 62. The constant hydraulic pressure source 70 includes a master reservoir 84, a pump 85 and an accumulator 86. The working fluid in the master reservoir 84 is pressurized by the pump 85, and the pressurized fluid is stored in the accumulator 86. The accumulator 86 is provided with two pressure switches 87, 88 which detect respective upper and lower limits of the fluid pressure in the accumulator 86. The pump 85 is turned on and off according to ON and OFF actions of these pressure switches 87, 88, which have a hysteresis. In this arrangement, the pressure of the working fluid stored in the accumulator 86 is held within a predetermined range. The constant hydraulic pressure source 70 is connected to the above-indicated pressurizing chamber 74, so that the pressurized fluid is supplied from the accumulator 86 to the pressurizing chamber 74 upon depression of the brake pedal 76. This arrangement makes it possible to reduce the required operating stroke of the brake pedal 76.

The above-indicated fluid passage 80 is provided with two solenoid-operated shut-off valves 90, 92, which are opened and closed to selectively connect and disconnect the master cylinder 68 to and from the wheel brake cylinders 32, 34. The wheel brake cylinders 32, 34 are disconnected from the master cylinder 68 when the braking system is operated in a cooperative control mode or in the anti-lock control mode. In the cooperative control mode, the vehicle is braked with a combination of the regenerative braking torque and the hydraulic braking torque.

A fluid passage 93 connecting the wheel brake cylinders 32, 34 and the master reservoir 84 is provided with pressure reducing valves in the form of solenoid-operated shut-off valves 94, 96, which are opened to effect fluid communication between the master reservoir 84 and the wheel brake cylinders 32, 34, so that the fluid pressures in the wheel brake cylinders 32, 34 are lowered, whereby the hydraulic braking torque generated by these wheel brake cylinders 32, 34 is reduced.

A fluid passage 98 connecting the wheel brake cylinders 32, 34 and the linear solenoid valve device 56 is provided with pressure increasing valves in the form of solenoid-operated shut-off valves 100, 102. When the braking system is normally operated in the cooperative control mode, the shut-off valves 100, 102 are held in their open states, for fluid communication between the linear solenoid valve device 56 and the wheel brake cylinders 32, 34. By-pass passages by-passing these solenoid-operated shut-off valves 100, 102 are provided with respective check valves 104, 106 which permit flows of the fluid from the corresponding wheel brake cylinders 32, 34 toward the linear solenoid valve device 56 but inhibits flows of the fluid in the opposite direction. In the presence of these check valves 104, 106, the working fluid can be rapidly returned from the wheel brake cylinders 32, 34 toward the linear solenoid valve device 56 when the depressed brake pedal 76 is released to its non-operated position. A solenoid-operated shut-off valve 108 is provided in a portion of the above-indicated fluid passage 98 between the linear solenoid valve device 56 and the shut-off valves 100, 102. This shut-off valve 108 is opened when the braking system is operated in the cooperative control mode, or in the anti-lock control mode for the front wheels 10, 12.

The linear solenoid valve device 56 indicated above is provided in the fluid passage 82 connecting the pressurizing chamber 74 and the wheel brake cylinders 64, 66 for the rear wheels 60, 62. The fluid passage 98 indicated above is connected to a portion of the fluid passage 82 between the linear solenoid valve device 56 and the wheel cylinders 60, 62. A pressure increasing valve in the form of a solenoid-operated shut-off valve 110 is provided between the linear solenoid valve device 56 and the wheel brake cylinders 64, 66. A by-pass passage by-passing the shut-off valve 110 is provided with a check valve 112 which permits a flow of the fluid from the wheel brake cylinders 64, 66 toward the linear solenoid valve device 56 and inhibits a flow of the fluid in the opposite direction. A pressure reducing valve in the form of a solenoid-operated shut-off valve 116 is provided in a fluid passage 114 connecting the wheel brake cylinders 64, 66 and the master reservoir 84. The fluid passage 82 is further provided with a proportioning valve 118 to control the fluid pressures in the wheel brake cylinders 64, 66 for the rear wheels 60, 62 such that the fluid pressures in the wheel brake cylinders 64, 66 are not higher than those in the wheel brake cylinders 32, 34 for the front wheels 10, 12. As is apparent from FIG. 2, the present embodiment is arranged such that the fluid pressures in the wheel brake cylinders 64, 66 for the rear wheels 60, 62 are concurrently controlled in the same manner.

A pressure sensor 122 is connected to a portion of the fluid passage 82 between the linear solenoid valve device 56 and the master cylinder 68. Another pressure sensor 124 is connected to a portion of the fluid passage 82 between the linear solenoid valve device 56 and the wheel brake cylinders 64, 66. A further pressure sensor 132 is connected to the fluid passage 98. This pressure sensor 132 is provided to detect a failure of the above-indicated pressure sensor 124. Described in detail, the pressure sensor 124 is considered to be defective if the output signal of the pressure sensor 124 is greatly different from that of the pressure sensor 132 when the solenoid-operated shut-off valve 108 is placed in the open state.

As shown in FIG. 3, the linear solenoid valve device 56 includes a pressure increasing control valve in the form of a pressure increasing linear solenoid valve 150, a pressure reducing control valve in the form of a pressure reducing linear solenoid valve 152, a pressure reducing reservoir 154 and check valves 156, 158. The pressure increasing linear solenoid valve 150 is connected to the fluid passage 82 extending from the pressurizing chamber 74, while the pressure reducing linear solenoid valve 152 is connected to a fluid passage 160 connecting the fluid passage 82 and the pressure reducing reservoir 154. The check valve 156 is provided in a by-pass passage which by-passes the pressure increasing linear solenoid valve 150. The check valve 156 permits a flow of the fluid from the wheel brake cylinders 32, 34, 64, 66 toward the master cylinder 68 but inhibits a flow of the fluid in the opposite direction. The check valve 158 is provided in a by-pass passage which by-passes the pressure reducing linear solenoid valve 152. The check valve 158 permits a flow of the fluid from the pressure reducing reservoir 154 toward the master cylinder 68 but inhibits a flow of the fluid in the opposite direction.

The pressure increasing linear solenoid valve 150 includes a seating valve 190, and a solenoid-operated biasing device 194. The seating valve 190 includes a valve member 200, a valve seat 202, a biased member 204 movable with the valve member 200, and a spring 206 which biases the biased member 204 in a direction for seating the valve member 200 onto the valve seat 202. The solenoid-operated biasing device 194 includes a solenoid coil 210, a hold member 212 made of a resin for holding the solenoid coil 210, a first magnetic path defining member 214, and a second magnetic path defining member 216. When a voltage is applied across the solenoid coil 210, a current flows through the solenoid coil 210, and a magnetic field is produced. The magnetic force acting between the biased member 204 and the second magnetic path defining member 216 is varied by changing the voltage to be applied to the solenoid coil 210.

A protrusion 220 is formed on one of the opposite end faces of the biased member 204 which is located on the side of the second magnetic path defining member 216. On the other hand, the end face of the second magnetic path defining member 216 which is opposite to the protrusion 220 has a recess 222. The protrusion 220 is engageable with this recess 222 such that the biased member 204 and the member 216 are axially movable relative to each other. The above-indicated spring 206 is accommodated in the recess 222.

Upon application of a voltage to the solenoid coil 210, there is formed a magnetic path defined by the solenoid coil 210, first magnetic path defining member 214, biased member 204, second magnetic path defining member 216 and first magnetic path defining member 214. The magnetic reluctance of the magnetic path formed by the biased member 204 and the second magnetic path defining member 216 varies with a change in the relative axial position of the members 204, 216. Described in detail, the outer circumferential surface of the protrusion 220 of the biased member 204 and the inner circumferential surface of the recess 222 of the second magnetic path defining member 216 have respective portions which are opposed to each other with a small clearance therebetween. A change in the relative axial position will cause a change in the surface area of the mutually opposed portions of the outer and inner circumferential surfaces of the protrusion 220 and recess 222. If the members 204, 216 were simply disposed with their end faces opposed to each other with a small axial clearance therebetween, a decrease in the axial distance between the opposed end faces of the members 204, 216 as a result of their movements toward each other would cause an exponential decrease in the magnetic reluctance and an exponential increase in the magnetic force which acts between the members 204, 216. In the present pressure increasing linear solenoid valve 150, however, the movements of the members 204, 216 toward each other will cause an increase in the above-indicated surface area of the opposed portions of the circumferential surfaces of the members 204, 216, and an increase in the magnetic flux passing the circumferential surfaces, while at the same time cause a decrease in the magnetic flux passing the clearance between the opposed end faces of the members 204, 216. As a result, the magnetic force which biases the biased member 204 toward the second magnetic path defining member 216 can be held substantially constant irrespective of the relative axial position of the members 204, 216, provided the voltage applied to the solenoid coil 210 is not so high and is held constant. On the other hand, the biasing force of the spring 206 which biases the member 204 away from the second magnetic path defining member 216 increases with the movements of the members 204, 216 toward each other. Therefore, in the absence of a force which acts on the valve member 200 based on the fluid pressure difference, a movement of the biased member 204 toward the member 216 is terminated when the magnetic force becomes equal to the biasing force of the spring 206.

The magnetic force acting on the biased member 204 in the direction toward the second magnetic path defining member 216 increases with an increase in the voltage applied across the solenoid coil 210. The relationship between the magnetic force and the voltage can be known. By continuously changing the voltage applied to the solenoid coil 210, the force biasing the biased member 204 can be changed accordingly.

An increase in the voltage applied to the solenoid coil 210 increases the magnetic force, resulting in a decrease in the force acting on the valve member 200 in the direction for seating onto the valve seat 202, so that the valve member 200 can be unseated from the valve seat 202 with an accordingly reduced force. When the biasing force based on the pressure difference across the valve member 200 becomes larger than the force acting on the biased member 204, the valve member 200 is spaced away from the valve seat 202. The force acting on the biased member 204 is equal to the biasing force of the spring 206 minus the magnetic force. The above-indicated pressure difference at which the valve member 200 is spaced away from the valve seat 202 (at which the valve 150 is opened) will be referred to as an "opening pressure difference" of the valve 150. This opening pressure difference is reduced as the voltage applied to the solenoid coil 210 is increased.

The pressure reducing linear solenoid valve 152 is basically identical in construction with the pressure increasing linear solenoid valve 150, except for a spring 224 whose biasing force is different from that of the spring 206 of the pressure increasing linear solenoid valve 150. The opening pressure difference of this pressure reducing linear solenoid valve 152 is also reduced as the voltage applied to the solenoid coil 210 is increased. The same reference numerals as used for the pressure increasing linear solenoid valve 150 are used to identify the functionally corresponding elements of the pressure reducing linear solenoid valve 152, and redundant description of these elements will not be provided.

In the present embodiment, the opening pressure difference of the pressure increasing linear solenoid valve 150 is set to be about 3 MPa (about 30.6 kgf/cm$^2$), while the opening pressure difference of the pressure reducing linear solenoid valve 152 is set to be larger than 18 MPa (about 184 kgf/cm$^2$), which is the maximum pressure of the fluid received from the constant hydraulic pressure source 70. In this respect, it is noted that the biasing force of the spring 224 is higher than (about six times as much as) the biasing force of the spring 206. In the present hydraulically operated braking device 30, the maximum fluid pressure which acts on the valve member 200 of the pressure reducing linear solenoid valve 152 is the maximum pressure of the fluid pressurized by the pump 85 and accommodated in the accumulator 86. Therefore, there exists substantially no possibility that the fluid pressure pressurized by the master cylinder 68 upon depression of the brake pedal 76 by the vehicle operator exceeds the maximum pressure in the accumulator 86, resulting in a flow of the fluid into the pressure reducing reservoir 154 through the pressure reducing linear solenoid valve 152. The working fluid stored in the pressure reducing reservoir 154 is returned to the master cylinder 68 through the fluid passage 160, check valve 158, check valve 156 and fluid passage 82, upon termination of a braking operation of the braking system.

The fluid passage 80 is provided with a pressure sensor 226 for detecting the pressure in the master cylinder 68, as shown in FIG. 2. Since the pressure in the master cylinder 68 corresponds to an operating force acting on the brake pedal 76, the braking torque corresponding to this master cylinder pressure is considered to be a total braking torque desired by the vehicle operator. As also shown in FIG. 2, a stroke simulator 228 is connected to the fluid passage 80. The stroke simulator 228 functions to permit the brake pedal 76 to be depressed with a certain operating stroke even when the solenoid-operated shut-off valves 90, 92 are both held closed.

The present hydraulically operated braking device 30 is provided with a brake switch 250 for detecting an operation or depression of the brake pedal 76, and wheel speed sensors 252, 254, 256, 258 for detecting the rotating speeds of the respective wheels 10, 12, 60, 62. On the basis of the output signals of these wheel speed sensors 252-258, slipping states of the wheels are obtained, and the running speed of the motor vehicle is estimated.

The voltage to be applied to the solenoid coil 210 of one of the pressure increasing and reducing linear solenoid valves 150, 152 (hereinafter referred to as "control voltage of the linear solenoid valve device 56") is determined so that the fluid pressure as detected by the pressure sensor 124 is equal to a pressure corresponding to a desired hydraulic braking torque (which will be described). When the opening pressure difference of the pressure increasing linear solenoid valve 150 is reduced by increasing the voltage to be applied to the solenoid coil 210 of the valve 150, the fluid pressure as detected by the pressure sensor 124 is increased. When the opening pressure difference of the pressure reducing linear solenoid valve 152 is reduced by increasing the voltage to be applied to the solenoid coil 210 of the valve 152, the fluid pressure as detected by the pressure sensor 124 is lowered. The desired hydraulic braking torque is equal to the desired total braking torque minus an actual regenerative braking torque.

In the cooperative control mode, the fluid pressure as detected by the pressure sensor 124 is assumed to be almost equal to the fluid pressure in each wheel brake cylinder 32, 34, 64, 66. Accordingly, the hydraulic braking torque corresponding to the fluid pressure as detected by the pressure sensor 124 can be considered to be the hydraulic braking torque to be applied to each wheel 10, 12, 60, 62.

The desired total braking torque is determined on the basis of the output signal of the pressure sensor 226. The fluid pressure in the pressurizing chamber 72 is considered to correspond to the operating force acting on the brake pedal 76, that is, correspond to the required braking torque (desired total braking torque) as desired by the vehicle operator. Therefore, the desired total braking torque is determined depending upon the fluid pressure in the pressurizing chamber 72. However, the desired total braking torque may be determined on the basis of any other parameters indicative of the operating state of the brake pedal 76, such as the operating stroke or time of the brake pedal 76.

The desired regenerative braking torque is determined to be the smallest one of an electricity generating upper limit, an electricity storing upper limit and an operating force upper limit. The electricity generating upper limit is an upper limit of the regenerative braking torque determined by the rotating speed or other parameters of the electric motor 28 when the electric motor 28 functions as an electric generator. The electricity storing upper limit is an upper limit of the regenerative braking torque determined by charging capacity, temperature and other parameters of the electric energy storage device 36. The operating force upper limit, which corresponds to the desired total braking torque indicated above, is an upper limit of the regenerative braking torque determined by the operating force acting on the brake pedal 76. That is, the desired regenerative braking torque is determined to be a maximum regenerative braking torque which does not exceed the desired total braking torque and at which the energy efficiency is maximum. While the present embodiment is adapted to determine the desired regenerative braking torque to be the maximum regenerative braking torque at which the energy efficiency is maximum, the desired regenerative braking torque may be determined otherwise. For instance, the desired regenerative braking torque may be determined on the basis of the desired total braking torque and the above-indicated electricity storing upper limit or electricity generating upper limit. Further, the desired regenerative braking torque which varies in the present embodiment may be a predetermined constant value, for instance, a maximum regenerative braking torque value determined based on the charging capacity of the electric energy storage device 36 or the capacity of the electric motor 28.

Figure 4A:
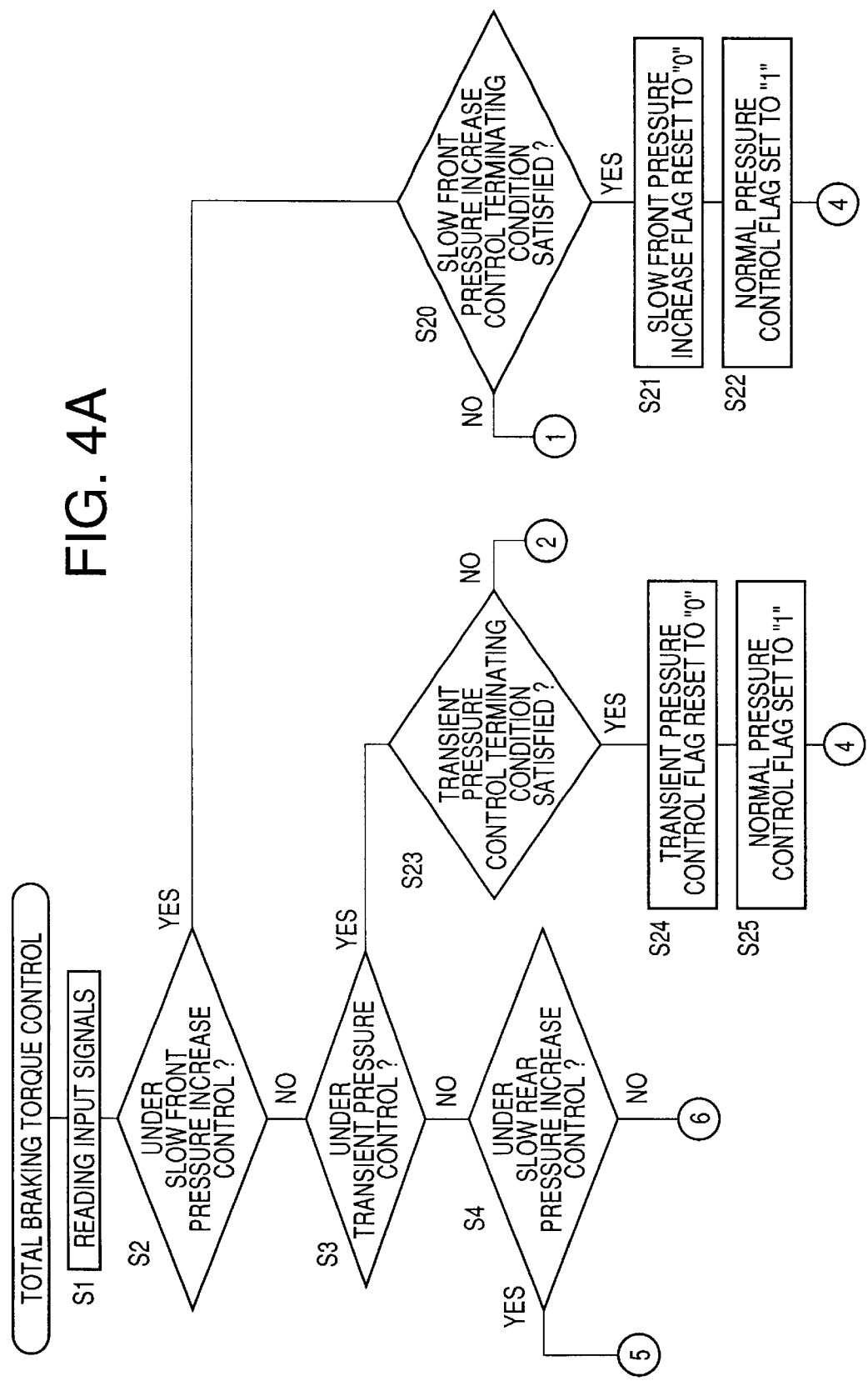
Figure 4B:
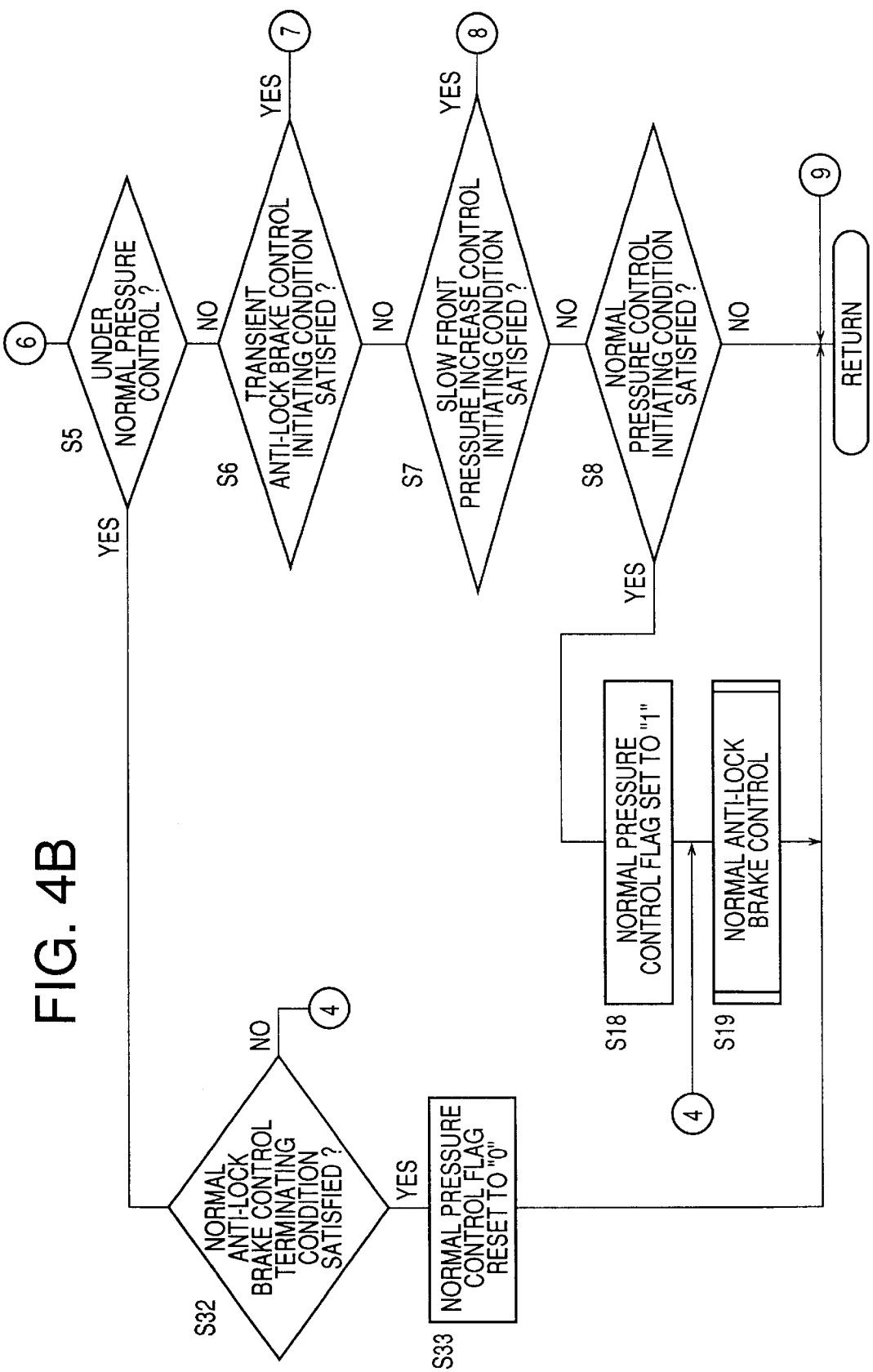
Figure 4D:
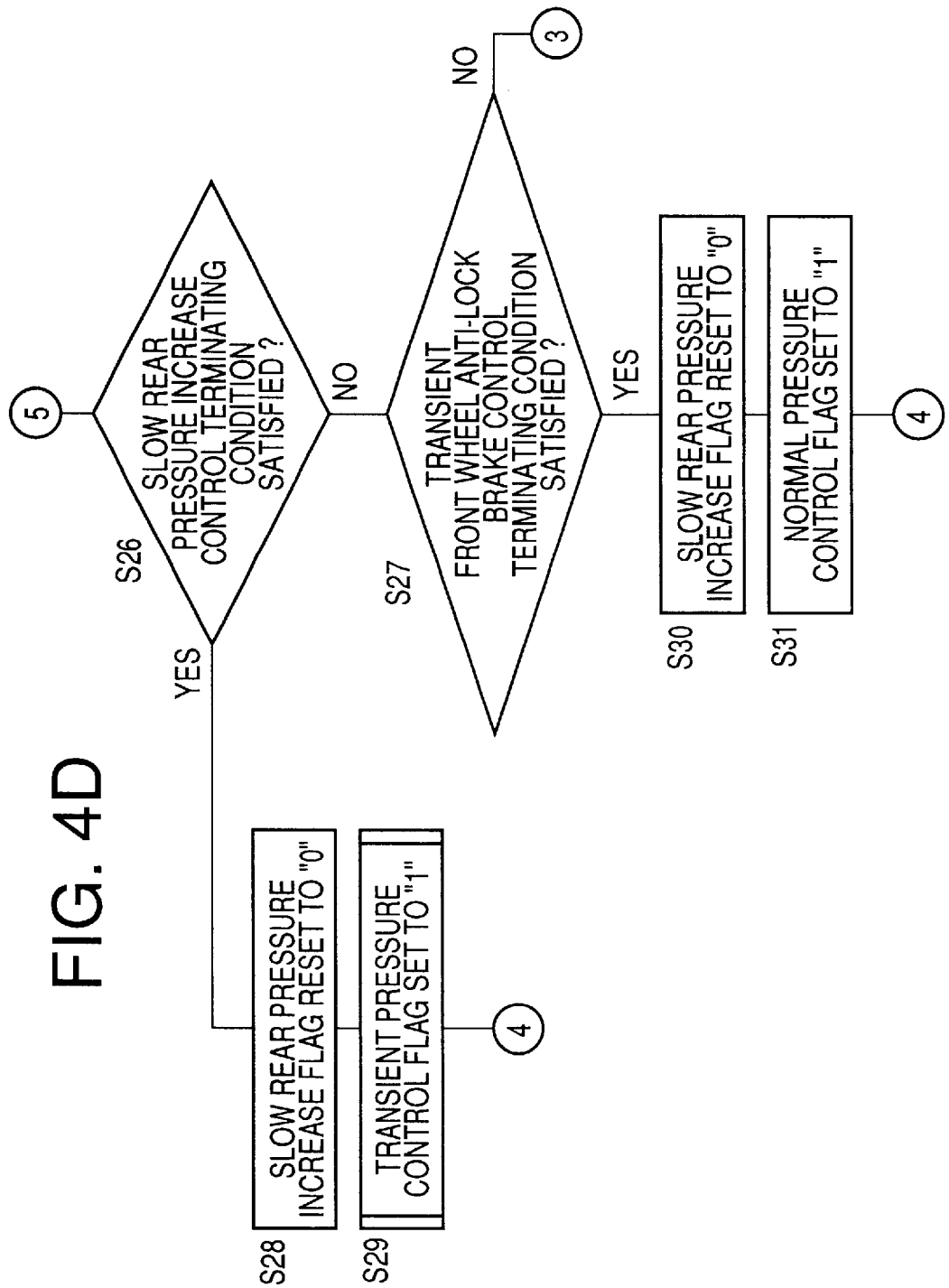

Each of the total braking torque controller 46 and the motor control device 42 is principally constituted by a computer incorporating a ROM (read-only memory), a RAM (random-access memory) and a PU (processing unit). To an input portion of the total braking torque controller 46, there are connected the above-indicated pressure sensors 122, 124, 226, an encoder 260 for detecting the operating speed of the electric motor 28, and a charging capacity detector 262 for detecting the charging capacity of the electric energy storage device 36. To an output portion of the total braking torque controller 46, there are connected through respective driver circuits the solenoid coils of the solenoid-operated shut-off valves 90, 92, 94, 96, 100, 102, 108, 110, 116 and the solenoid coils 210 of the linear solenoid valve device 56. The ROM stores various control programs, and a plurality of tables representing relationships between pressure increase and decrease times and the regenerative braking torque. The control programs include a program (not shown) for controlling the braking system in the cooperative control mode, a total braking torque control program illustrated in the flow chart of FIG. 4, a normal anti-lock brake control program, and a transient anti-lock brake control program.

To an input portion of the motor control device 42, there are connected the above-indicated encoder 260, and an accelerator detector (not shown) for detecting an operating state of the accelerator pedal. To an output portion of the motor control device 42, there is connected the electric power converting device 40. The ROM stores various control programs such as a driving torque control program and a regenerative braking torque control program. The electric power converting device 40 is controlled so as to obtain the driving torque corresponding to the operating state of the accelerator pedal, and to obtain the regenerative braking torque almost equal to the desired regenerative braking torque.

The motor control device 42 and total braking torque controller 46 are interconnected to each other for data communication therebetween. Namely, information representing the desired regenerative braking torque is transmitted from the total braking torque controller 46 to the motor control device 42, and information representing the actual regenerative braking torque is transmitted from the motor control device 42 to the total braking torque controller 46.

In the vehicle braking system constructed as described above, a depression of the brake pedal 76 will cause application of the total braking torque including at least one of the hydraulic and regenerative braking torques to each wheel 10, 12, 60, 62. That is, both of the hydraulic and regenerative braking torques are applied to each drive wheel 10, 12, while only the hydraulic braking torque is applied to each non-drive wheel or driven wheel 60, 62.

As described above, the hydraulic braking torque is controlled to be a value equal to the desired total braking torque minus the actual regenerative braking torque. Since the actual regenerative braking torque is controlled so as to approach the desired regenerative braking torque which is determined to be the maximum regenerative braking torque having the maximum energy efficiency, it is possible to minimize wasting of the kinetic energy of the vehicle, and reduction of the energy efficiency.

In the total braking torque controller 46, the desired total braking torque is determined on the basis of the fluid pressure in the master cylinder 68 as detected by the pressure sensor 226, and the desired regenerative braking torque is determined to be the maximum value at which the maximum efficiency is obtained. Information representing the desired regenerative braking torque is supplied to the motor control device 42.

In the regenerative braking device 14, the electric power converting device 40 is controlled by the motor controller 42 such that the actual regenerative braking torque coincides with the desired value. The actual regenerative braking torque is obtained on the basis of the operating speed of the electric motor 28, and information representing the actual regenerative braking torque is supplied to the total braking torque controller 46. The total braking torque controller 46 calculates the desired hydraulic braking torque by subtracting the actual regenerative braking torque from the desired total braking torque, and determines the control voltage of the linear solenoid valve device 56. When the actual regenerative braking torque is zero, the control voltage is determined so that the desired hydraulic braking torque coincides with the desired total braking torque.

When the total braking torque of at least one of the wheels 10, 12, 60, 62 exceeds an upper limit corresponding to the friction coefficient of the road surface, the anti-lock brake control is initiated, with the shut-off valves 90, 92 being closed and with the shut-off valve 108 being opened. When the regenerative braking torque is zero, the normal anti-lock brake control is effected. When the regenerative braking torque is not zero, the regenerative braking torque is zeroed, and a transient total braking torque control is effected.

The transient total braking torque control includes at least one of: a transient anti-lock brake control; and a transient hydraulic braking torque increase gradient restricting control. The latter control is for controlling the total braking torque so as to restrict or restrain the gradient of increase in the hydraulic braking torque of the non-anti-lock-controlled wheels which are not subject to the anti-lock brake control. The transient hydraulic braking torque increase gradient restricting control includes: a front wheel gradient restricting control for restricting the gradient of increase in the hydraulic braking torque for the front or drive wheels; and a rear wheel gradient restricting control for restricting the gradient of increase in the hydraulic braking torque for the rear or non-drive wheels. In the transient hydraulic braking torque increase gradient restricting control, the gradient or rate at which the hydraulic braking torque is increased for the non-anti-lock-controlled wheels is restricted or restrained, so that the hydraulic braking torque for the non-anti-lock-controlled wheels is only slowly increased. In this respect, the "transient hydraulic braking torque increase gradient restricting control" will be referred to as "transient slow hydraulic braking torque increase control" where appropriate.

Where the braking torques of the front wheels (drive wheels) exceed the upper limit, the transient anti-lock brake control is effected for the front wheels, while the transient slow hydraulic braking torque increase control is effected for the rear wheels (non-drive wheels). Where the braking torques of the rear wheels exceed the upper limit, the normal anti-lock brake control is effected for the rear wheels, while the transient slow hydraulic braking torque increase control is effected for the front wheels (drive wheels). Where the braking torques of the front and rear wheels exceed the upper limit, the transient anti-lock brake control is effected for the front wheels, while the normal anti-lock brake control is effected for the rear wheels.

As described above, the control voltage of the linear solenoid valve device 56 is controlled such that the hydraulic braking torque corresponding to the fluid pressure as detected by the pressure sensor 124 coincides with the desired hydraulic braking torque which is a difference obtained by subtracting the actual regenerative braking torque from the desired total braking torque. Therefore, when the actual regenerative braking torque is zeroed, the control voltage is controlled so as to rapidly increase the output pressure of the linear solenoid valve device 56, for rapidly increasing the hydraulic braking torques to be applied to all the wheels. For the non-drive wheels 60, 62, the hydraulic braking torque is increased by an amount corresponding to the actual regenerative braking torque which has been zeroed, so that the total braking torque is rapidly increased due to a rapid increase in the hydraulic braking torque. In this case, the anti-lock brake control is initiated at a time earlier than required, or the running stability of the vehicle is deteriorated. For the drive wheels 10, 12, the actual regenerative braking torque which has been zeroed is replaced by the hydraulic braking torque, so that the total braking torque is to be held substantially constant. Actually, however, the hydraulic braking torque is rapidly increased temporarily, since the gradient or rate of increase in the hydraulic braking torque is higher than the gradient or rate of decrease in the hydraulic braking torque.

Thus, the hydraulic braking torques to be applied to all the wheels are rapidly increased when the regenerative braking torque is zeroed. For the wheels which are subject to the anti-lock brake control, the hydraulic braking torque is controlled by controlling the solenoid-operated shut-off valves, so as to prevent a rapid increase in the hydraulic braking torque. For the non-anti-lock-controlled wheels which are not subject to the anti-lock brake control, on the other hand, the hydraulic braking torque is not controlled by the shut-off valves, and therefore it is desirable to restrict or restrain an increase in the gradient of increase in the hydraulic braking torque. The present embodiment is adapted to restrict the rate of increase in the hydraulic braking torque for the non-anti-lock-controlled wheels, irrespective of whether the wheels subject to the anti-lock brake control are the front wheels or the rear wheels, that is, irrespective of whether the transient anti-lock brake control is effected for the drive wheels 10, 12, or the normal anti-lock brake control is effected for the non-drive wheels 60, 62. Namely, the gradient of increase in the hydraulic braking torque is restricted for the non-anti-lock-controlled wheels which are either the drive wheels or the non-drive wheels.

The normal anti-lock brake control will be briefly discussed. The normal anti-lock brake control is initiated when the following inequality as the initiating condition is satisfied for any one of the wheels 10, 12, 60, 62:

$$\Delta Vw > \Delta VSN + \Delta VR$$

wherein $\Delta Vw$ represents an amount of slip of each appropriate wheel, $\Delta VSN$ represents an amount of slip of the wheel when the acceleration of the wheel has been lowered below a predetermined lower limit, and $\Delta VR$ represents a reference slip amount of the wheel.

The normal anti-lock brake control is terminated when one of the following terminating conditions is satisfied: when the operated brake pedal 76 is returned to the non-operated position; and when the running speed of the vehicle has been lowered below a predetermined threshold.

In the normal anti-lock brake control, one of a pressure decrease mode, a pressure hold mode and a pressure increase mode is selected on the basis of the slipping state and acceleration value of the wheel. The pressure increase mode includes: a pressure increase time control sub-mode in which the fluid pressure in the wheel brake cylinder is increased at a relatively high rate; a pulse number increase sub-mode in which the fluid pressure in the wheel brake cylinder is increased at a relatively low rate; and a dither increase sub-mode which is established upon termination of the pulse number increase sub-mode.

Where the increase time control sub-mode is selected, the pressure increasing time is determined on the basis of the acceleration of the vehicle, for example. Since the cycle time which is a sum of the pressure increasing time and the pressure holding time is predetermined, the pressure holding time is automatically determined when the pressure increasing time is determined. An increase in the pressure increasing time increases a ratio of the pressure increasing time to the pressure holding time (to the cycle time), so as to increase the rate or gradient at which the fluid pressure in the wheel brake cylinder is increased. Where the pulse increase sub-mode is selected, the pressure increasing time, the pressure holding time and the number of pressure control pulses are determined on the basis of the slipping state of the wheel.

The transient total braking torque control is initiated when a condition for initiating the transient total braking torque control is satisfied. This initiating condition is satisfied if the condition for initiating the normal anti-lock brake control is satisfied more than a predetermined time after the brake pedal 76 is depressed. If the condition for initiating the normal anti-lock brake control is satisfied more than the predetermined time after depression of the brake pedal 76, it indicates that the condition for initiating the anti-lock brake control is satisfied while the brake pedal 76 is depressed relatively slowly for braking the vehicle for a relatively long time. Where the condition for initiating the anti-lock brake control is satisfied during abrupt or rapid brake application to the vehicle, on the other hand, the fluid pressure in the pressurizing chamber 74 is sufficiently high, so that the transient total braking torque control is not effected. When the brake pedal 76 is depressed slowly for a relatively long time, the fluid pressure in the pressurizing chamber 74 is not so high, so that if the regenerative braking torque was zeroed and the normal anti-lock brake control was effected, the brake cylinder pressure could not be increased at a sufficiently high rate, and the total braking torque would be insufficient for the drive wheels which are subject to the anti-lock brake control. The transient anti-lock brake control is initiated when the condition for initiating the transient total braking torque control is satisfied and when the braking torque of the drive wheels exceeds the upper limit.

The transient total braking torque control is terminated when the transient anti-lock brake control and the transient slow hydraulic braking torque increase control are both terminated. Usually, however, the transient slow hydraulic braking torque increase control is terminated before the transient anti-lock brake control.

The transient anti-lock brake control is terminated when at least one of the following conditions is satisfied: (a) where the condition for terminating the normal anti-lock brake control is satisfied; (b) where the pressure decrease mode is selected for the second time for at least one of the front wheels 10, 12 when the actual regenerative braking torque represented by the information from the motor control device 42 is held smaller than a predetermined value for more than a predetermined time duration or when the transient anti-lock brake control is effected for more than a predetermined time; (c) where the actual regenerative braking torque represented by the information from the motor control device 42 is held smaller than the predetermined value for more than the predetermined time; and (d) the predetermined time has passed after the initiation of the transient anti-lock brake control.

Usually, the condition (b) is satisfied first of all the conditions (a)–(d). The pressure decrease mode selected after the regenerative braking torque is zeroed is considered to be selected due to the hydraulic braking torque. Therefore, when the condition (b) is satisfied, it is considered that there exists no influence of the regenerative braking torque and that there exists no need to effect the transient anti-lock brake control. The predetermined value is determined in view of a potential case wherein the regenerative braking torque as represented by the information from the motor control device 42 is larger than zero due to a noise while the actual regenerative braking torque is in fact zero. The predetermined time duration for which the regenerative braking torque is held smaller than the predetermined value is determined to prevent the termination of the transient anti-lock brake control after it is executed for only a short time. In this respect, it is noted that the initiating condition for initiating the transient anti-lock brake control may be satisfied successively for the two front wheels 10, 12 during running of the vehicle on a road surface having an even friction coefficient for these two wheels, for example. In this case, the pressure decrease mode may be selected for the first time successively for the two front wheels 10, 12 in a short period of time. In this instance, the pressure decrease mode selected for the first time for one of the front wheels for which the initiating condition was satisfied subsequently to the other front wheel may be erroneously determined to be the second selection of the pressure decrease mode for the above-indicated other front wheel for which the initiating condition was satisfied previously. In this event, the transient anti-lock brake control is terminated, and the total braking torque of the drive wheels would be insufficient. The predetermined time duration indicated above is determined to be long enough to avoid this drawback. If this time duration is excessively long, however, the fluid pressure in the brake cylinder would be increased at an excessively high gradient even upon second and subsequent operations to increase the brake cylinder pressure, leading to a possibility of control hunting. In view of these possible phenomenons, the time duration is suitably determined. The predetermined time for which the transient anti-lock brake control is effected is used to prevent a drawback which would occur if it is not be possible to detect that the actual regenerative braking torque is held zero for more than the predetermined time. This predetermined time is determined so that the actual regenerative braking torque can be reduced to zero, even if the actual regenerative braking torque immediately before it is zeroed is equal to the nominal maximum value which is determined by the capacity of the electric motor 28 and the charging capacity of the electric energy storage device 36.

If the pressure decrease or pressure hold mode is selected during the transient anti-lock brake control, the brake cylinder pressure is reduced or held constant in the same manner as in the normal anti-lock brake control. If the pressure increase mode is selected, the pressure increasing time, pressure holding time and pressure increasing pattern (number of pressure control pulses) are compensated on the basis of the regenerative braking torque immediately before zeroing of this torque (hereinafter referred to as "prior regenerative braking torque value") and the acceleration value of the motor vehicle. For this compensation, the ROM of the total braking torque controller 46 stores tables representative of the relationships between the compensating amounts of the pressure increasing time, pressure holding time and pressure increasing pattern and the prior regenerative braking torque and vehicle acceleration values. The compensating amounts to increase the pressure increasing time and the pressure increasing pulse number increase with an increase in the prior regenerative braking torque value and decrease with an increase in the vehicle acceleration value. The compensating amount to reduce the pressure holding time increases with an increase in the prior regenerative braking torque value and decreases with an increase in the vehicle acceleration value. The rate of increase of the brake cylinder pressure increases with an increase in the pressure increasing time and a decrease in the pressure holding time. These compensations are accomplished in any form of the pressure increase mode, that is, in any one of the pressure increase time control sub-mode, pulse number increase sub-mode and dither increase sub-mode.

While the present embodiment is adapted to compensate the compensating amounts on the basis of the prior regenerative braking torque and the vehicle acceleration value, the compensation may be effected on the basis of at least one of the prior regenerative braking torque and the vehicle acceleration value, or on the basis of other parameters such as the deceleration value of the appropriate wheel.

In the case where hunting of the wheel speed is detected, the brake cylinder pressure is controlled in a hunting preventive mode wherein the compensating amounts are reduced to a half of the normal amounts, so that the amount of increase of the hydraulic braking torque is reduced for reducing the possibility of the hunting. Although the present embodiment is adapted to reduce the compensating amounts (absolute values) to a half of the normal amounts in the hunting preventive mode, the reduction ratio of the compensating amounts may be otherwise determined. For instance, the compensating amounts in the hunting preventive mode may be reduced to ½, ⅓, ¼, ⅕, ⅔ or ¾ of the normal amounts, or may be zeroed.

The hunting of the wheel speed is detected if an extremely large amount of change in the wheel acceleration value is detected two or more times. The wheel acceleration value is detected during an anti-lock brake control. If the detected wheel acceleration value has changed from a positive value to a negative value, this change is detected as an extremely large amount of change in the wheel acceleration, that is, as the hunting of the wheel speed.

In the slow rear wheel hydraulic braking torque increase control in the transient total braking torque control, the rate of increase of the hydraulic braking torque for the rear wheels 60, 62 as the non-drive wheels is restricted to a value which is determined by the total braking torque (hereinafter referred to as "prior total braking torque value") immediately before the regenerative braking torque is zeroed. The hydraulic braking torque for the rear wheels 60, 62 is desirably increased smoothly or at a low rate until it reaches the prior total braking torque value. In the present embodiment, the number of pressure control pulses required for increasing the hydraulic braking torque of the rear wheels 60, 62 to the prior total braking torque value is stored in the ROM of the total braking torque controller 46, in relation to the prior total braking torque value.

The slow rear wheel hydraulic braking torque increase control is terminated when the number of the pressure control pulses has reached the value determined by the stored relationship indicated above. This control is terminated also when the anti-lock brake control is initiated for one of the rear wheels 60, 62.

The slow rear wheel hydraulic braking torque increase control is effective to reduce the deterioration in running stability of the vehicle, as compared with hydraulic braking torque control in which the hydraulic braking torque is increased at a comparatively high rate. The rear wheel slow hydraulic braking torque control makes it possible to retard the point of time at which the anti-lock brake control is initiated for the rear wheels 60, 62. If the hydraulic braking torque for the rear wheels 60, 62 before this slow hydraulic braking torque increase control is relatively large, it is possible to avoid insufficiency of the total braking torque when the anti-lock brake control is initiated for at least one of the rear wheels 60, 62.

In the slow front wheel hydraulic braking torque increase control, the rate of increase of the hydraulic braking torque for the front wheels 10, 12 is controlled so as to timely compensate for an amount of reduction in the total braking torque (which amount corresponds to the prior regenerative braking torque value which has been zeroed), for smoothly increasing the hydraulic braking torque for the front wheels. This slow front wheel hydraulic braking torque increase control is not initiated immediately after the information representative of the desired regenerative braking torque (which is zero) is supplied from the total braking torque controller 46 to the motor control device 42, but after a predetermined time has passed after the information is supplied to the motor control device 42, that is, after the actual regenerative braking torque has begun to decrease. In the present embodiment, the rate of increase of the hydraulic braking torque for the front wheels is determined depending upon the prior regenerative braking torque value. The relationships between this prior regenerative braking torque value and the pressure increasing time, pressure holding time and pressure increasing pulse number are represented by the tables stored in the ROM of the total braking torque controller 46.

The slow front wheel hydraulic braking torque increase control is terminated when the number of the pressure control pulses has reached the value determined by the appropriate relationship or when the anti-lock brake control is initiated for the front wheels.

As described above, the total braking torque control has four control configurations (H), (I), (J) and (K):

(H) The normal anti-lock brake control is effected.

(I) The transient slow hydraulic braking torque increase control is effected for the front wheels, while the normal anti-lock brake control is effected for the rear wheels.

(J) The transient anti-lock brake control is effected for the front wheels, while the transient slow hydraulic braking torque increase control is effected for the rear wheels.

(K) The transient anti-lock brake control is effected for the front wheels, while the normal anti-lock brake control is effected for the rear wheels.

When the transient slow rear wheel hydraulic braking torque increase control is terminated in the control configuration (J), the control flow goes to the control configuration (K). When the control configuration (K) is terminated, the control flow goes to the control configuration (H). In the following description, the control configurations (H), (I), (J) and (K) will be respectively referred to as "normal pressure control", "slow front pressure increase control", "slow rear pressure increase control" and "transient pressure control".

Referring to the flow chart of FIGS. 4A–4D, the total braking torque control routine will be described. This routine is initiated with step S1 to read the rotating speeds of the wheels and the estimated running speed of the motor vehicle. Then, the control flow goes to steps S2–S5 to determine whether any one of the above-indicated slow front pressure increase control, transient pressure control, slow rear pressure increase control and normal pressure control is presently effected. These determinations in steps S2–S5 are made by determining whether respective slow front pressure increase flag, transient pressure control flag, slow rear pressure increase flag and normal pressure control flag are set at "1" or "0". If negative decision (NO) is obtained in all of these steps S2–S5, the control flow goes to step S6 to determine whether the transient anti-lock brake control initiating condition is satisfied, step S7 to determine whether the slow front pressure increase control initiating condition is satisfied, and step S8 to determine whether the normal pressure control initiating condition is satisfied. The same initiating condition in step S6 is used for determining whether the slow rear pressure increase control should be initiated, and for determining whether the transient pressure control should be initiated. When the transient anti-lock brake control initiating condition is satisfied, that is, when an affirmative decision (YES) is obtained in step S6, the slow front pressure increase control initiating condition (step S7) and the normal pressure control initiating condition (step S8) are always satisfied. When the slow front pressure increase control initiating condition is satisfied, that is, when an affirmative decision (YES) is obtained in step S7, the normal pressure control (normal anti-lock brake control) initiating condition is always satisfied. Accordingly, steps S6, S7 and S8 are implemented in this order. If these steps were implemented in the reverse order, the slow rear pressure increase control cannot be implemented, for example.

If the transient anti-lock brake control initiating condition is satisfied, the affirmative decision (YES) is obtained in step S6, and the control flow goes to step S9 to zero the desired regenerative braking torque and inform the motor control device 42 that the desired regenerative braking torque should be zeroed. Step S9 is followed by step S10 to determine whether the anti-lock brake control initiating condition is satisfied for only the front wheel or wheels, or for both the front wheel(s) and the rear wheel(s). If the anti-lock brake control initiating condition is satisfied for only at least one of the front wheels 10, 12, the control flow goes to step S11 in which the slow rear pressure increase flag is set to "1", and to step S12 in which the transient anti-lock brake control is effected for the front wheels, while the slow rear pressure increase control is effected for the rear wheels. If the anti-lock brake control initiating condition is satisfied for both of the front and rear wheels, the control flow goes to step S13 to set the transient pressure control flag to "1", and step S14 in which the transient anti-lock brake control is effected for the front wheels, while the normal anti-lock brake control is effected for the rear wheels.

When the transient anti-lock brake control initiating condition is not satisfied but the slow front pressure increase control initiating condition is satisfied, that is, when a negative decision (NO) is obtained in step S6 while an affirmative decision (YES) is obtained in step S7, the control flow goes to step S15 to zero the desired regenerative braking torque, then to step S16 to set the slow front pressure increase flag to "1", and then to step S17 in which the slow pressure increase control is effected for the front wheels, so as to restrict or limit the rate of increase of the hydraulic braking torque for the front wheels, while the anti-lock brake control is effected for the rear wheels.

When the normal pressure control initiating condition is satisfied, that is, when an affirmative decision (YES) is obtained in step S8, the control flow goes to step S18 to set the normal pressure control flag to "1", and then to S19 in which the normal anti-lock brake control is effected for at least one of the four wheels.

When the slow front pressure increase flag is set at "1", an affirmative decision (YES) is obtained in step S2, and the control flow goes to step S20 to determine whether a slow front pressure increase control terminating condition is satisfied. If this terminating condition is not satisfied, the control flow goes to step S17 in which the slow front pressure increase control is continued. If the terminating condition is satisfied, the control flow goes to step S21 to reset the slow front pressure increase flag to "0", and then to step S22 to set the normal pressure control flag to "1". Then, step S19 is implemented to effect the normal anti-lock brake control. Thus, the slow front pressure increase control is changed to the normal pressure control upon termination of the slow front pressure increase control.

When the transient control flag is set at "1", an affirmative decision (YES) is obtained in step S3, and the control flow goes to step S23 to determine whether a transient pressure control terminating condition is satisfied. If this terminating condition is not terminated, the control flow goes to step S14 in which the transient anti-lock brake control is continued for the front wheels while the normal anti-lock brake control is effected for the rear wheels. If the terminating condition is satisfied, the control flow goes to steps S24 and S25 similar to the above-indicated steps S21 and S22, to reset the transient pressure control flag to "0" and set the normal pressure control flag to "1".

When the slow rear pressure increase flag is set at "1", an affirmative decision (YES) is obtained in step S4, and the control flow goes to step S26 to determine whether a slow rear pressure increase control terminating condition is satisfied for the rear wheels, and to step S27 to determine whether a transient anti-lock brake control terminating condition is satisfied for the front wheels. In most case, an affirmative decision (YES) is obtained in step S26 before an affirmative decision (YES) is obtained in step S27. In other words, the affirmative decision is hardly obtained in step S27 before the affirmative decision is obtained in step S26. When the slow rear pressure increase control terminating condition is satisfied, the control flow goes to step S28 to reset the slow rear pressure increase flag to "0", and then to step S29 to set the transient pressure control flag to "1". Then, step S14 is implemented to effect the transient anti-lock brake control for the front wheels and the normal anti-lock brake control for the rear wheels. When the transient anti-lock brake control terminating condition is satisfied for the front wheels, that is, when the affirmative decision (YES) is obtained in step S27, the control flow goes to step S30 to reset the slow rear pressure increase flag to "0" and to step S31 to set the normal pressure control flag to "1". Then, step S19 is implemented to effect the normal pressure control. When neither the slow rear pressure increase control terminating condition nor the transient front wheel anti-lock brake control terminating condition is satisfied, a negative decision (NO) is obtained in step S27, and the control flow goes to step S12 in which the slow rear pressure increase control is continued.

When the normal pressure control flag is set at "1", that is, when an affirmative decision (YES) is obtained in step S5, the control flow goes to step S32 to determine whether a normal anti-lock brake control terminating condition is satisfied. If this terminating condition is not satisfied, step S19 is implemented in which the normal anti-lock brake control is continued. When the terminating condition is satisfied, the control flow goes to step S33 to reset the normal pressure control flag to "0", whereby the anti-lock brake control is terminated. If the transient pressure control is terminated when the anti-lock control terminating condition is satisfied, the transient pressure control flag is reset to "0", and the normal pressure control flag is set to "1". In this case, the affirmative decision is obtained in step S32, and the normal anti-lock brake control is also terminated.

As described above, the braking system according to the present embodiment is adapted to effect the transient total braking torque control when the regenerative braking torque is zeroed during brake application with both the regenerative braking torque and the hydraulic braking torque. This arrangement permits significant reduction of an influence which arises from the zeroing of the regenerative braking torque. Where the anti-lock-controlled wheels are the drive wheels, the present arrangement is effective to minimize the problem of insufficiency of the total braking torque for the drive wheels. Further, the present arrangement makes it possible to restrict the rate or gradient of increase of the hydraulic braking torque for the non-anti-lock-controlled wheels.

It will be understood that the total braking torque controller 46 constitutes total braking torque control means, braking torque control means operable during application of one of regenerative and frictional braking torques, and braking torque control means operable during application of both of regenerative and frictional braking torques. It will also be understood that a portion of the total braking torque controller 46 assigned to implement steps S12, S14 and S17 constitutes the braking torque control means operable during application of both of the regenerative and frictional braking torques. Further, this braking torque control means includes second anti-lock control means operable during application of both of regenerative and frictional braking torques, for effecting a transient anti-lock brake control for front wheel, and frictional braking torque increase gradient restricting means for restricting a gradient of increase in frictional braking torque for non-anti-lock-controlled wheel. It will further be understood that a portion of the total braking torque controller 46 assigned to implement step S19 constitutes first anti-lock control means operable during application of one of regenerative and frictional braking torques.

In the present embodiment, the transient anti-lock brake control is arranged to compensate the pressure increasing time, pressure holding time, number of pressure control pulses which have been once determined in the normal anti-lock brake control. However, the transient anti-lock brake control is arranged to directly determine the final pressure increasing time, pressure holding time and number of pressure control pulses, on the basis of suitable parameters such as the prior regenerative braking torque value, the acceleration value of the vehicle wheel and the amount of slip of the vehicle wheel.

While the transient anti-lock brake control is also arranged such that the gradient of increase of the brake cylinder pressure in the pressure increase mode is higher than in the normal anti-lock brake control, the gradient of decrease of the brake cylinder pressure in the pressure decrease mode may be made lower than in the normal anti-lock brake control. The gradient of increase of the brake cylinder pressure in all of the pressure increase time control sub-mode, pulse number increase sub-mode and dither increase sub-mode need not be higher. That is, the gradient of increase in at least one of those increase sub-modes is made higher in the transient anti-lock brake control than in the normal anti-lock brake control. It is also noted that the transient anti-lock brake control terminating conditions are not limited to those indicated above. For instance, the transient anti-lock brake control may be terminated after a predetermined number of pressure increasing operations have been completed. It is further noted that steps S10 and S13 may be eliminated, if it is assumed that the anti-lock control initiating condition is not satisfied simultaneously for both the front wheels and the rear wheels. It is to be understood that the content of the anti-lock brake control is not limited to the details described above with respect to the above embodiment.

It is also to be understood that the construction of the hydraulic braking device and the construction of the regenerative braking device are not limited to the details of the above embodiment. The linear solenoid valve device 56 may include a plurality of solenoid-operated shut-off valves. Further, the linear solenoid valve device 56 may be provided for each of the front and rear pairs of wheels. In this case, it is possible to avoid a sudden increase of the hydraulic braking torque for the rear wheels 60, 62, which would take place when the anti-lock brake control is effected for at least one of the front wheels 10, 12. While the electric motor 28 is provided for the two front wheels 10, 12 in the above embodiment, each of the front wheels 10, 12 may be provided with the electric motor 28. Where drum brakes are provided for the front wheels 10, 12, an electric motor may be provided within the drum of the drum brake for each front wheel. In this case, the space required for installing the electric motors is reduced. The electric motor or motors 28 may be provided for the rear drive wheels, or for all of the drive wheels of a four-wheel drive vehicle. Further, the electric motor or motors 28 may be provided for the drive wheels of an electric vehicle without an internal combustion engine.

There will be described a braking system for use on an electric vehicle, which is constructed according to a second embodiment of the present invention.

Figure 5:
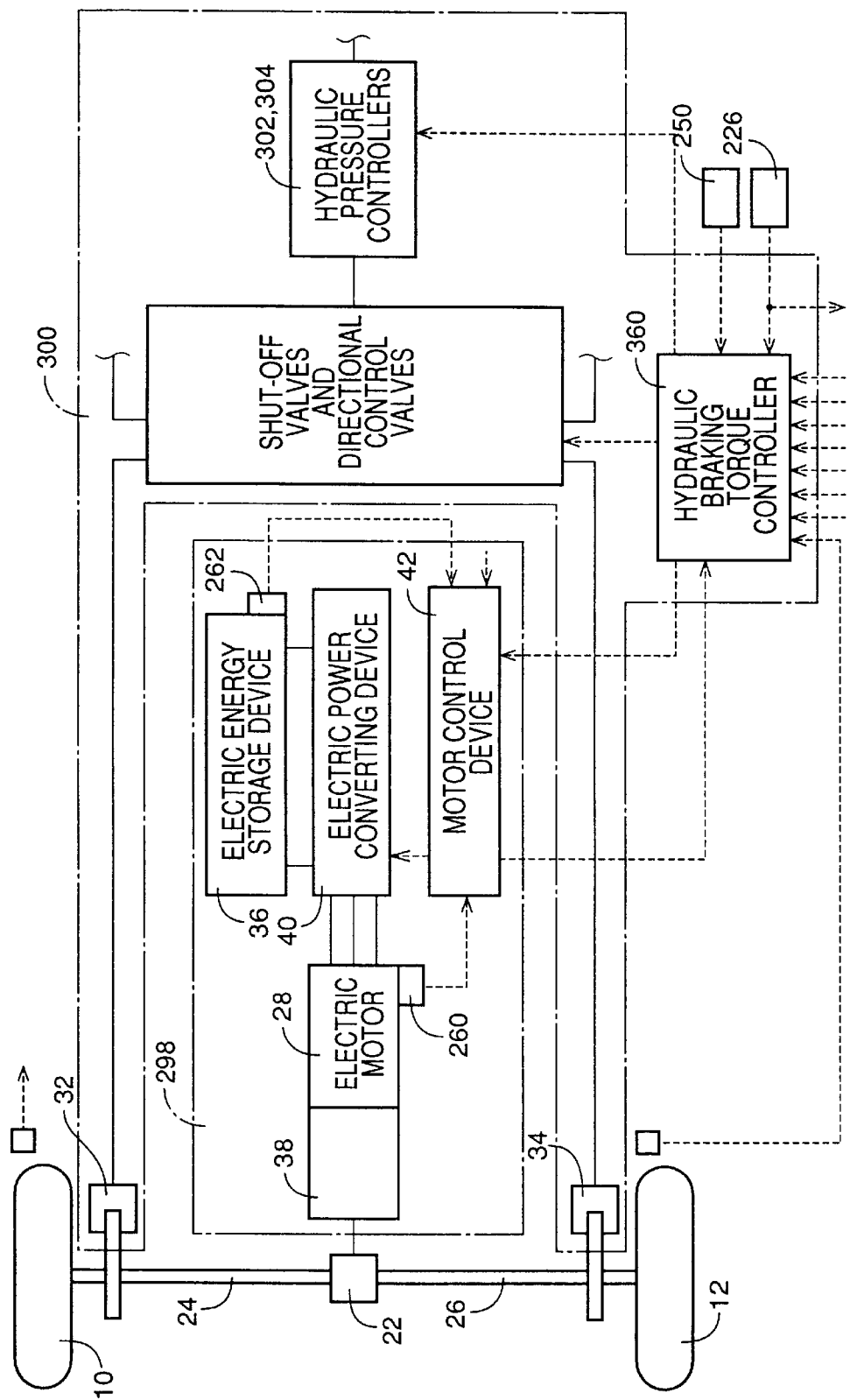
FIG. 5 is a schematic view showing a general arrangement of a braking system of a motor vehicle according to another embodiment of this invention.
Figure 6:
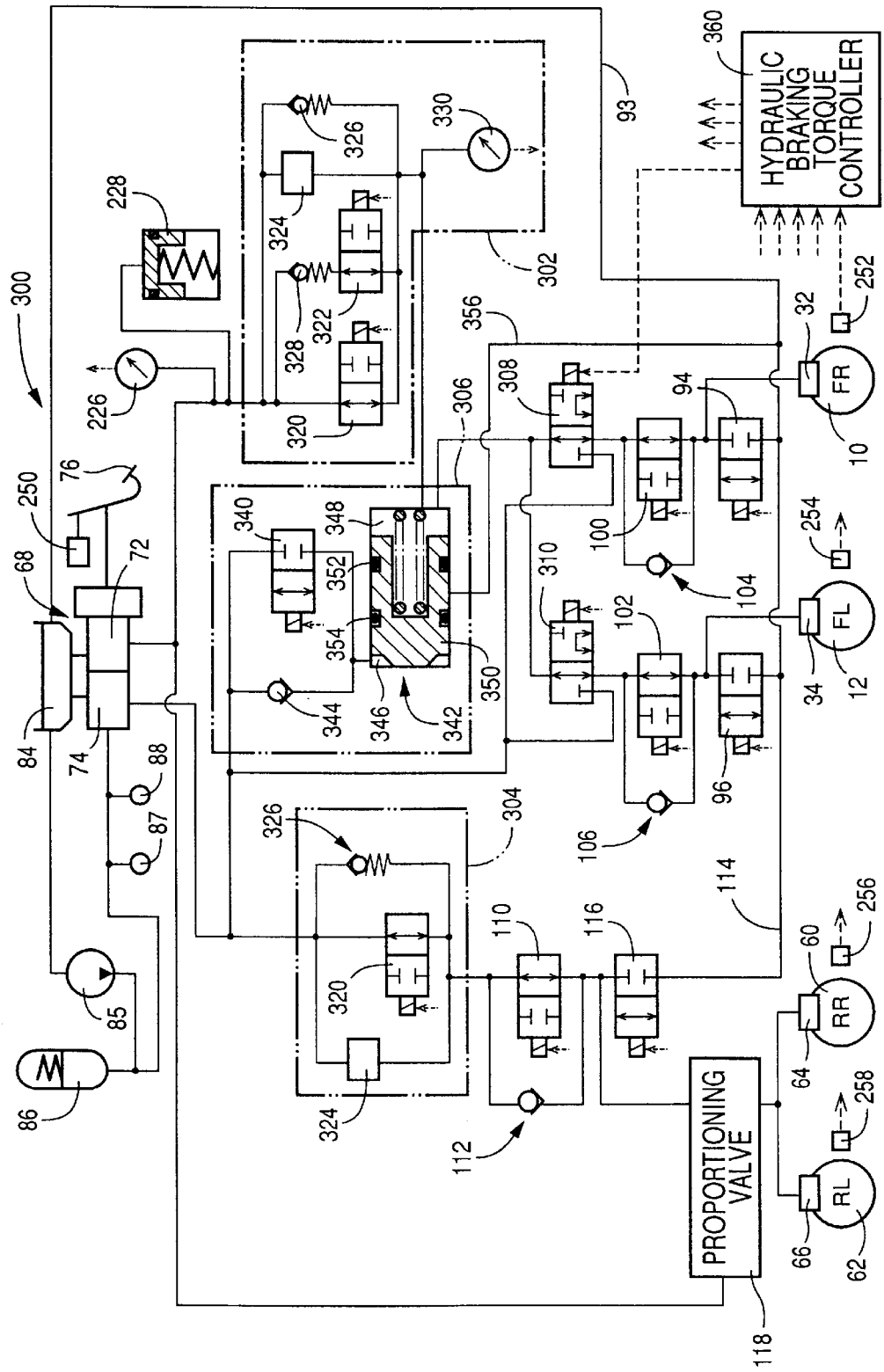
FIG. 6 is a diagram showing a hydraulically operated braking device included in the braking system of FIG. 5.

The present braking system includes a regenerative braking device 298 as shown in FIG. 5, and a hydraulically operated braking device 300 as shown in FIG. 6.

The regenerative braking device 298 of FIG. 5 is almost identical with the regenerative braking device 42 of the braking system according to the first embodiment. In the present regenerative braking device 298, however, the electric power converting device 40 is adapted to control the motor control device 42 such that the electric motor 28 generates a maximum regenerative braking torque. To this end, the charging capacity detector 262 for detecting the charging state of the electric energy storage device 36 is connected to the motor control device 42, and the pressure sensor 226 for obtaining the desired total braking torque is connected to the motor control device 42 as well as a hydraulic braking torque controller 360 of the hydraulic braking device 300. However, the pressure sensor 226 need not be connected to the motor control device 42. Where the pressure sensor 226 is not connected to the motor control device 42, the output signal of the pressure sensor 226 is applied to the motor control device 42 through the hydraulic braking torque controller 360.

In FIG. 6, the same reference numerals as used in FIG. 2 will be used to identify the elements of the hydraulic braking device 300 which are identical with those of the hydraulic braking device 30 of the first embodiment. Redundant description of these elements will not be provided.

In the hydraulic braking device 300, hydraulic pressure controllers 302, 304 are provided for the front and rear wheels, respectively, in place of the linear solenoid valve device 56. In addition, a front brake pressure increasing device 306 is provided for increasing the hydraulic braking torque for the front wheels 10, 12, by applying the fluid pressure of the pressurizing chamber 74 to the wheel brake cylinders 32, 34 of the front wheels 10, 12. Further, directional control valves 308, 310 are provided in place of the solenoid-operated shut-off valves 90, 92. These directional control valves 308, 310 are normally placed in their first position for connecting the wheel brake cylinders 32, 34 to the hydraulic pressure controller 302 and for disconnecting the wheel brake cylinders 32, 34 from the pressurizing chamber 74. When an anti-lock brake control is initiated for the wheel brake cylinders 32, 34, the directional control valves 308, 310 are switched to their second position for connecting the wheel brake cylinders 32, 34 to the pressurizing chamber 74 and for disconnecting the wheel brake cylinders 32, 34 from the pressure control device 302. The fluid pressure of the pressurizing chamber 74 is utilized to effect the anti-lock brake control for controlling the hydraulic braking torque values (wheel brake cylinder pressures) for all wheels 10, 12, 60, 62. That is, the fluid pressure of the accumulator 86 of the constant hydraulic pressure source 70 connected to the pressurizing chamber 74 is utilized for the anti-lock brake control for all of the wheels 10, 12, 60, 62.

The hydraulic pressure controller 302 is provided between the pressurizing chamber 72 and the wheel brake cylinders 32, 34. This hydraulic pressure controller 302 includes solenoid-operated shut-off valves 320, 322, a proportioning valve 324, pressure relief valves 326, 328, and a pressure sensor 330. The two solenoid-operated shut-off valves 320, 322, the proportioning valve 324 and the pressure relief valve 326 whose opening pressure difference is higher than that of the other pressure relief valve 328 are connected in parallel with each other. The solenoid-operated shut-off valve 322 and the pressure relief valve 328 having the higher opening pressure difference are connected in series with each other.

When the solenoid-operated shut-off valve 320 is in an open state, the pressurized fluid of the pressurizing chamber 72 of the master cylinder 68 is delivered to the wheel brake cylinders 32, 34 through the solenoid-operated shut-off valve 320. The fluid pressure in the wheel brake cylinders 32, 34 increases along a solid line a in FIG. 7 with an increase in the master cylinder pressure. When the solenoid-operated shut-off valve 320 is in a closed state, the pressurized fluid of the pressurizing chamber 72 is delivered to the wheel brake cylinders 32, 34 through the proportioning valve 324. In this case, the wheel brake cylinder pressure increases along a broken line b in FIG. 7. That is, the fluid pressure of the master cylinder 68 is reduced by the proportioning valve 324, so that the reduced fluid pressure is applied to the wheel brake cylinders 32, 34. As a result, the pressure difference between the master cylinder 68 and the wheel brake cylinders 32, 34 is increased, and the pressure relief valve 328 is opened when this pressure difference has reached the opening pressure difference PL of the pressure relief valve 328. Consequently, the pressurized fluid of the master cylinder 68 is supplied to the wheel brake cylinders 32, 34 through the pressure relief valve 328 and the solenoid-operated shut-off valve 322, so that the wheel brake cylinder pressure increases along a one-dot chain line c in FIG. 7. When the solenoid-operated shut-off valve 322 as well as the solenoid-operated shut-off valve 320 is in a closed state, the wheel brake cylinder pressure increases along the broken line b, and the pressure relief valve 326 is opened when the pressure difference between the master cylinder 68 and the wheel brake cylinders 32, 34 has reached the opening pressure difference PH of the pressure relief valve 326 (which is higher than the opening pressure difference PL). Consequently, the pressurized fluid is delivered to the wheel brake cylinders 32, 34 through the pressure relief valve 326. In this case, the wheel brake cylinder pressure increases along a two-dot chain line d in FIG. 7.

The fluid pressure in the wheel brake cylinders 32, 34 can be controlled by opening and closing the solenoid-operated shut-off valves 320, 322 in the hydraulic pressure controller 302. In the present embodiment, however, the solenoid-operated shut-off valve 322 is held in the closed state, so that the fluid pressure in the wheel brake cylinders 32, 34 change along the solid line a or the broken line b and two-dot chain line d. That is, the wheel brake cylinder pressure changes along the solid line a when the solenoid-operated shut-off valve 320 is placed in the open state, and along the broken line b and two-dot chain line d when the shut-off valve 320 is placed in the closed state. The shut-off valve 320 is placed in the open state when the regenerative braking torque is not applied to the front wheels 10, 12, and placed in the closed state when the regenerative braking torque is applied to the front wheels 10, 12. The shut-off valve 320 is controlled according to a control program for controlling the braking system in the cooperative control mode.

The hydraulic pressure controller 304, which is similar to the hydraulic pressure controller 302, includes the solenoid-operated shut-off valve 320, proportioning valve 324 and pressure relief valve 326, which have been described above with respect to the hydraulic pressure controller 302. However, the hydraulic pressure controller 304 does not include the solenoid-operated shut-off valve 322 and the pressure relief valve 328 which are included in the hydraulic pressure controller 302. The fluid pressure in the wheel brake cylinders 64, 66 for the rear wheels 60, 62 may increase along the solid line a or the broken line b and two-dot chain line d. In the present embodiment, however, the solenoid-operated shut-off valve 320 is held in the open state, so that the fluid pressure in the rear wheel brake cylinders 64, 66 increases along the solid line a.

The front brake pressure increasing device 306 includes a solenoid-operated shut-off valve 340, a separating cylinder 342 and a check valve 344. The pressurizing chamber 74 is connected to one fluid chamber 346, and the hydraulic pressure controller 302 and the front wheel brake cylinders 32, 34 are connected to the other fluid chamber 348 of the separating cylinder 342. The separating cylinder 342 includes a separating piston 350 slidably received in a housing, and two sealing members in the form of O-rings 352, 354 fitted on the outer circumferential surface of the separating piston 350 at two axially spaced-apart positions thereof. The O-rings 352, 354 provide fluid tightness between the separating piston 350 and the housing of the separating cylinder 342. The bore of the separating cylinder 342 is connected, at a position between the two O-rings 352, 354, to the master reservoir 84 through a fluid passage 356, so that a damage or excessive wear of the O-rings 352, 354 may be detected, as described below.

When the solenoid-operated shut-off valve 340 is placed in the closed state, the fluid whose pressure is controlled by the hydraulic pressure controller 302 is delivered to the wheel brake cylinders 32, 34 through the fluid chamber 348. When the shut-off valve 340 is in the open state, the fluid pressure of the pressurizing chamber 74 is applied to the fluid chamber 346, and is transmitted to the fluid chamber 348 through the separating piston 350. Namely, the volume of the fluid chamber 348 is reduced, so that the fluid pressure in the wheel brake cylinders 32, 34 is accordingly increased.

Figure 7:
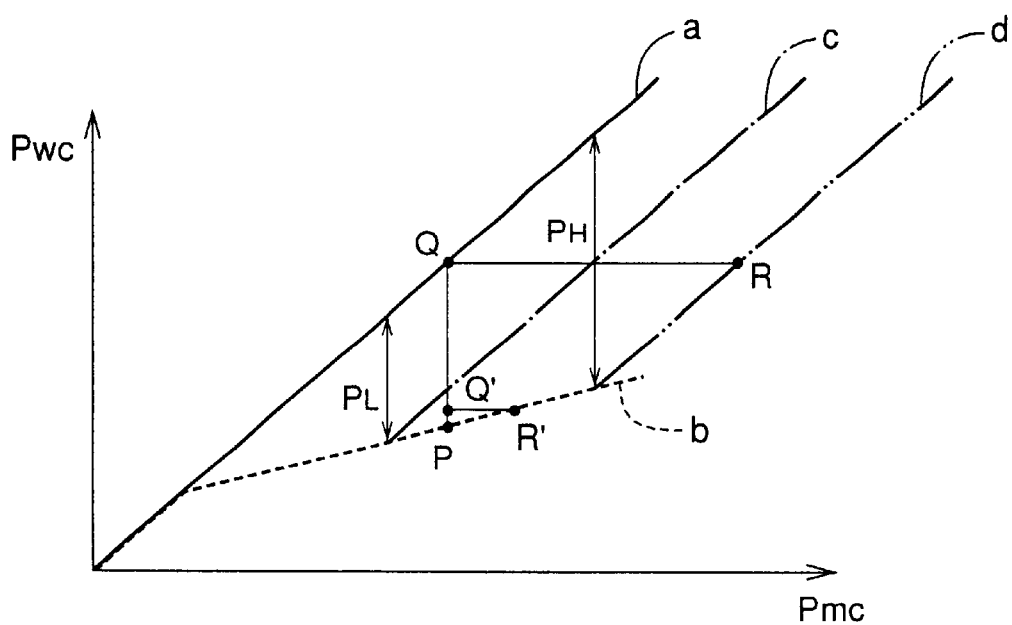
FIG. 7 is a view indicating an operation of a hydraulic pressure controller included in the hydraulically operated braking device of FIG. 6.

As shown in FIG. 7, the fluid pressure in the wheel brake cylinders 32, 34 is determined in relation to the master cylinder pressure. Therefore, the fluid pressure in the wheel brake cylinders 32, 34 alone cannot be increased. Under some condition, however, the hydraulic braking torque for the front wheels 10, 12 is required to be increased. In this case, the fluid pressure in the pressurizing chamber 74 is utilized to increase the fluid pressure in the wheel brake cylinders 32, 34.

Referring to the flow chart of FIG. 9, steps S51 and S52 are implemented to determine whether the regenerative braking control is possible, and whether the braking torque for the front wheels is necessary. The step S51 is provided to determine whether the actual regenerative braking torque by the regenerative braking device 298 is permitted or not, as described below. Normally, the control of the actual regenerative braking torque is permitted. However, this control is inhibited when the regenerative braking torque is required to be zeroed, for instance, when the anti-lock brake control is effected for the drive wheels (front wheels 10, 12). The braking torque for the front wheels while the control of the actual regenerative braking torque is permitted is required to be increased, where the total braking torque becomes insufficient due to reduction of the regenerative braking torque applied to the front wheels, for example.

Where the control of the regenerative braking torque is permitted and the regenerative braking torque is required to be increased, step S53 is implemented to switch the solenoid-operated shut-off valve 340 to the open state. In this case, the fluid pressure of the pressurizing chamber 74 is delivered to the fluid chamber 346 of the separating cylinder 342 on the side of the rear wheels 60, 62, and the fluid pressure in the front wheel brake cylinders 32, 34 is increased. This operation to switch the shut-off valve 340 to the open state may be called "dynamic pressure introducing control". Step S54 is provided to determine whether the wheel brake cylinder pressure is substantially equal to the master cylinder pressure. If an affirmative decision (YES) is obtained in step S54, the control flow goes to step S55 in which the shut-off valve 340 is closed while the shut-off valve 320 of the hydraulic pressure controller 302 for the front wheels 10, 12 is opened. Then, the wheel brake cylinder pressure is held substantially equal to the master cylinder pressure. The master cylinder pressure is detected by the pressure sensor 226, while the wheel brake cylinder pressure is detected by the pressure sensor 330.

If the solenoid-operated shut-off valve 340 is switched to the open state if the braking system is in a condition indicated by point P in FIG. 7, the fluid pressure Pwc in the wheel brake cylinders 32, 34 increases. The shut-off valve 340 is held in the open state until the front wheel brake cylinder pressure Pwc has reached the master cylinder pressure Pmc (indicated by point Q in FIG. 7). That is, the shut-off valve is switched to the closed state when the front wheel brake cylinder pressure Pwc has increased to the master cylinder pressure Pmc. When the brake pedal 76 is subsequently depressed, that is, when the depression force acting on the brake pedal 76 is increased, the master cylinder pressure Pmc is increased to a value indicated by point R while the fluid pressure Pwc in the wheel brake cylinders 32, 34 is held constant. A further increase in the depression force will cause the wheel brake cylinder pressure Pwc and the master cylinder pressure Pmc to change along the two-dot chain line d.

It is not essential to hold the solenoid-operated shut-off valve 340 in the open state until the wheel brake cylinder pressure has reached the master cylinder pressure. Namely, the shut-off valve 340 may be switched to the closed state when the wheel brake cylinder pressure has increased to a predetermined value, for instance, to a value indicated by point Q' in FIG. 7. When the depression force acting on the brake pedal 76 is increased, the master cylinder pressure Pmc increases to a value indicated by point R'. A further increase in the depression force acting on the brake pedal 76 will cause the wheel brake cylinder pressure and the master cylinder pressure to increase along the broken line b.

In the present braking system wherein the braking torque for the front wheels is increased as described above, the O-rings 352, 354 can be checked for a damage or excessive wear thereof, in the presence of the fluid passage 356 connecting the master reservoir 84 to an axial portion of the bore of the separating cylinder 342 between the two O-rings 352, 354.

In the event of damaging of the O-ring 352 on the side of the wheel brake cylinders 32, 34, the fluid in the fluid passage 80 is discharged into the master reservoir 84 through the O-ring 354 and the fluid passage 356. In this event, the fluid pressure in the wheel brake cylinders 32, 34 cannot be increased, so that this abnormality can be recognized by the vehicle operator. However, the rear wheel brake cylinders 62, 64 can be normally operated.

In the event of damaging of the O-ring 354 on the side of the master cylinder 68, the fluid in the fluid chamber 346 is discharged into the master reservoir 84 through the O-ring 354 and the fluid passage 356, and the fluid pressure in the wheel brake cylinders 32, 34 cannot be increased even when the solenoid-operated shut-off valve 340 is switched to the open state in step S53. Therefore, the wheel brake. cylinder pressure Pmc cannot increase to the master cylinder pressure Pmc within a predetermined time after the shut-off valve 340 is switched to the open state. As a result, an affirmative decision (YES) is obtained in step S56, and the control flow goes to step S55 in which the shut-off valve 340 is closed while the shut-off valve 320 is opened, so that the fluid is supplied from the pressurizing chamber 72 to the wheel brake cylinders 32, 34, causing the brake pedal 76 to be automatically moved toward the fully depressed position. This abnormal movement of the brake pedal 76 caused by damaging of the O-ring 354 of the front brake pressure increasing device 306 can be recognized by the vehicle operator.

Thus, the present braking system wherein the separating cylinder 342 is connected at its position between the two O-rings 352, 354 to the low-pressure source in the form of the master reservoir 84 permits the vehicle operator to recognize damaging of the O-rings 352, 354, that is, abnormality of the front brake pressure increasing device 306, assuring improved safety of the braking system.

The check valve 344 inhibits a flow of the working fluid in the direction from the master cylinder 68 toward the separating piston 342, and permits a flow of the fluid in the opposite direction. When the brake pedal 76 is operated toward the fully released position, the check valve 344 permits the fluid to be rapidly returned from the fluid chamber 346 to the master cylinder 68.

Figure 8B:
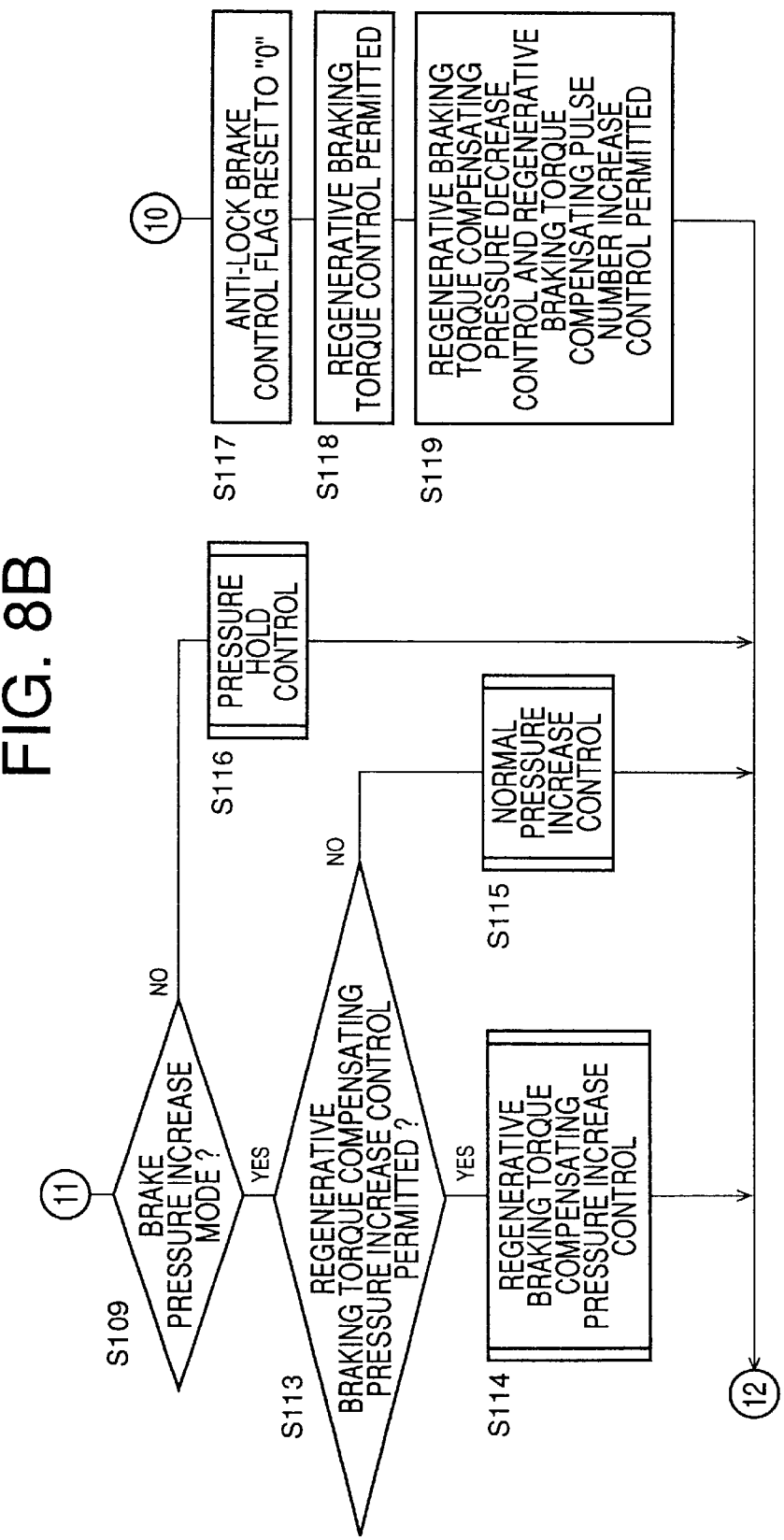

Like the total braking torque controller 46, the hydraulic braking torque controller 360 is principally constituted by a computer including a ROM which stores various tables and various control programs such as a control program for controlling the braking system in the cooperative control mode, a hydraulic braking torque control program illustrated in the flow chart of FIGS. 8A–8B a normal anti-lock brake control program, a transient anti-lock brake control program, and a control program as illustrated in the flow chart of FIG. 9, for controlling the front brake pressure increasing device 306.

The hydraulic braking torque controller 360 and the motor control device 42 are interconnected with each other for data communications therebetween. In the present second embodiment, the hydraulic braking torque controller 360 does not supply the motor control device 42 with the information representing the desired regenerative braking torque, but supplies the motor control device 42 with information for inhibiting the motor control device 42 from controlling the regenerative braking torque, and information permitting the motor control device 42 to control the regenerative braking torque. On the other hand, the motor control device 42 supplies the hydraulic braking torque controller 360 with information representing the actual regenerative braking torque. This information is in the form of ON/OFF signals indicating whether the actual regenerative braking torque is smaller or not smaller than a predetermined value. That is, the ON signal indicates that the actual regenerative braking torque is equal to or larger than the predetermined value, while the OFF signal indicates that the actual regenerative braking torque is smaller than the predetermined value.

There will be described an operation of the vehicle braking system constructed as described above.

When the brake pedal 76 is depressed, the working fluid in the two pressurizing chambers 72, 74 of the master cylinder 68 is pressurized to the substantially same level. In this condition, the various solenoid-operated shut-off valves and the directional control valves 308, 310 are placed in the states of FIG. 6. When the regenerative braking torque is zero, the hydraulic pressure controller 302 is placed in a condition wherein the solenoid-operated shut-off valve 320 is held open while the solenoid-operated shut-off valve 322 is held closed. The pressurized fluid of the pressurizing chamber 72 is delivered through the hydraulic pressure controller 302 to the wheel front brake cylinders 32, 34, while the pressurized fluid of the pressurizing chamber 74 is delivered through the hydraulic pressure controller 304 to the rear wheel brake cylinders 64, 66.

If the total braking torque applied to at least one of the vehicle wheels 10, 12, 60, 62 becomes larger than an upper limit corresponding to the friction coefficient of the road surface, the anti-lock brake control is initiated. In the anti-lock brake control, the hydraulic braking torque to be applied to each wheel under control is controlled so that the amount of slip of each wheel is held within an optimum range.

Where the anti-lock brake control is effected for at least one of the front wheels 10, 12, the directional control valves 308, 310 are switched to their second position for connecting the wheel brake cylinders 32, 34 to the pressurizing chamber 74. When a condition (described below) for inhibiting the regenerative braking torque control is satisfied, the motor control device 42 is supplied with the above-indicated information for inhibiting the regenerative braking torque control, so that the regenerative braking torque is zeroed, and the transient anti-lock brake control is effected for the front wheels 10, 12. At this time, however, the hydraulic pressure controller 304 for the rear wheels 60, 62 remains in the same state, and the hydraulic braking torques (total braking torques) of the rear wheels 60, 62 will not be rapidly increased. Therefore, unlike the first embodiment, the present second embodiment is not adapted to implement the slow rear wheel hydraulic braking torque increase control (rear wheel gradient restricting control).

Where the anti-lock brake control is initiated for at least one of the rear wheels 60, 62 prior to the initiation of the anti-lock brake control for at least one of the front wheels 10, 12, the fluid pressures in the rear wheel brake cylinders 64, 66 are controlled by the normal anti-lock brake control means. In this case wherein at least one of the rear wheels is subjected to the anti-lock brake control before the front wheels, the regenerative braking torque is not zeroed, so that the hydraulic pressure controller 302 remains in the same state, and the hydraulic braking torques of the front wheels 10, 12 will not be rapidly increased. Therefore, the slow front wheel hydraulic braking torque increase control (front wheel gradient restricting control) is not implemented, either. While the normal anti-lock brake control is effected for the rear wheel or wheels, the directional control valves 308, 310 are held in the original positions.

Like the first embodiment, the second embodiment is adapted to effect the transient anti-lock brake control for the front wheels which are the drive wheels, not for the rear wheels. It is also noted that the provision of the two hydraulic pressure controllers 302, 304 for the respective front and rear pairs of wheels eliminates the requirements for restricting the rates or gradients of increase of the hydraulic braking torques for the front and rear wheels, that is, eliminates the slow front wheel hydraulic braking torque increase control and the slow rear wheel hydraulic braking torque increase control.

The normal anti-lock brake control is initiated when the initiating condition is satisfied, and terminated when the terminating condition is satisfied. The normal anti-lock brake control initiating and terminating conditions are the same as used in the first embodiment. The selection of the pressure decrease mode, pressure hold mode, and the sub-modes of the pressure increase mode is also the same as in the first embodiment.

When the pressure decrease mode is selected, the pressure decreasing time is determined on the basis of suitable parameters such as the estimated running speed of the vehicle, the deceleration value of the wheel and the road surface condition. The pressure decreasing time is increased with a decrease in the estimated vehicle running speed, and with an increase in the wheel deceleration value. Further, the pressure decreasing time is increased as the road surface condition is deteriorated and as the friction coefficient of the road surface decreases.

The pressure increase mode includes the pressure increase time control sub-mode, the pulse number increase sub-mode and the dither increase sub-mode, as in the first embodiment. When the pressure increase time control sub-mode is selected, the pressure increasing time is determined on the basis of suitable parameters such as a peak value of the wheel acceleration as a result of the preceding pressure decreasing operation, the cumulative pressure decreasing time, the road surface condition, the fluid pressure in the accumulator 86 and the wheel speed. The peak value of the wheel acceleration is the maximum value of the wheel acceleration during the preceding period of pressure decrease which is terminated by the selection of the pressure increase sub-mode. The pressure increasing time is increased with an increase in the peak value of the wheel acceleration, and with an increase in the cumulative pressure decreasing time. The pressure increasing time is increased as the friction coefficient of the road surface decreases and as the road surface condition is deteriorated. Further, the pressure increasing time is reduced where the fluid pressure in the accumulator 86 is lower than a predetermined lower limit, namely, where the constant hydraulic pressure source 70 is abnormal or defective. The fluid pressure of the accumulator 86 lower than the lower limit is detected on the basis of the output signal of the pressure switch 88. The pressure increasing time is reduced also where a hunting state of the wheel speed is detected, and may be zeroed where the degree of the hunting is seriously high, so that the hunting is reduced or eliminated. As in the first embodiment, the cycle time of the pressure increase time control consisting of the pressure increasing time and the pressure holding time is a predetermined constant, so that the pressure holding time is automatically determined by the determined pressure increasing time. The wheel brake cylinder pressure is increased and held constant for the thus determined pressure increasing and holding times.

The hunting state of the wheel speed is estimated on the basis of the anti-lock brake control state. That is, the wheel is estimated to suffer from hunting, if the number of the control pulses upon the second selection of the pulse number increase sub-mode following a pressure decreasing operation and a pressure increasing operation is smaller than a predetermined value. In this case, it is considered that the anti-lock brake control mode has been changed from the pulse number increase sub-mode to the other mode, after the wheel brake cylinder pressure was once increased with the predetermined number of control pulses in the pulse number increase sub-mode. When the hunting state of the wheel speed is thus detected, the pressure increasing time is reduced so as to reduce or eliminate the hunting. This reduction of the pressure increasing time to reduce the wheel speed hunting is not effected if any one of the following conditions is satisfied: where the number of the control pulses in the pulse number increase sub-mode is larger than the predetermined value; where the anti-lock brake control is not effected; where the transient anti-lock brake control is effected; where the wheel lies on a stepped part of the road surface; and where the road surface condition is considerably poor. Thus, the control to reduce the wheel speed hunting is not effected during the transient anti-lock brake control, and is effected only when the normal anti-lock brake control is effected. It will be understood that the wheel speed hunting is monitored to determine whether the control to reduce the wheel speed hunting (i.e., reduction of the pressure increasing time) is necessary or not.

When the pulse number increase sub-mode is selected, the pressure increasing time and the pressure holding time are determined on the basis of suitable parameters such as the the slip ratio and acceleration value of the wheel, the road surface condition and the fluid pressure in the accumulator 86. The slip ratio is obtained with the vehicle turning condition taken into account. The ratio of the pressure increasing time to the pressure decreasing time is reduced with an increase in the wheel slip ratio, and is increased with an increase in the wheel acceleration value. Further, the ratio of the pressure increasing time is increased with an increase in the friction coefficient of the road surface, and is made higher when the wheel lies on a stepped part of the road surface. The ratio of the pressure increasing time is reduced with a decrease in the fluid pressure in the accumulator 86.

The transient anti-lock brake control includes a regenerative braking torque compensating pressure decrease control and a regenerative braking torque compensating pressure increase control. When the pressure decrease mode is selected while the braking system is in a state permitting the regenerative braking torque compensating pressure decrease control, the wheel brake cylinder pressure is decreased according to the regenerative braking torque compensating pressure decrease control. When the pressure decrease mode is selected while the braking system is placed in a state inhibiting the regenerative braking torque compensating pressure decrease control, the wheel brake cylinder pressure is decreased as in the normal anti-lock brake control. When the pressure increase mode is selected while the braking system is in a state permitting the regenerative braking torque compensating pressure increase control, the wheel brake cylinder pressure is increased according to the regenerative braking torque compensating pressure increase control. When the pressure increase mode is selected while the braking system is in a state inhibiting the regenerative braking torque compensating pressure increase control, the wheel brake cylinder pressure is increased as in the normal anti-lock brake control.

The present embodiment is further arranged to determine whether a condition for inhibiting the control of the regenerative braking torque generated by the regenerative braking device 298 is satisfied or not. If this inhibiting condition is satisfied, the regenerative braking device 298 is supplied with the information for inhibiting the regenerative braking torque control, so that the regenerative braking torque is zeroed. In the present second embodiment, the transient anti-lock brake control is effected when the condition for inhibiting the control of the regenerative braking torque is satisfied. In this sense, this inhibiting condition may be considered to be the condition for initiating the transient anti-lock brake control.

The condition for inhibiting the control of the regenerative braking torque is satisfied when the fluid pressure in the accumulator 86 is not lower than a predetermined lower limit (when the constant hydraulic pressure source 70 is normal) and when the anti-lock brake control initiating condition is satisfied for at least one of the front wheels 10, 12 while the operating speed of the brake pedal 76 is comparatively low. In other words, the condition for inhibiting the control of the regenerative braking torque is not satisfied and the transient anti-lock brake control is not effected, even when the anti-lock brake control initiating condition is satisfied for at least one of the rear non-drive wheels 60, 62.

The control of the regenerative braking torque is permitted when the anti-lock brake control terminating condition is satisfied, when the fluid pressure in the accumulator 86 is lower than the lower limit or when the hydraulic braking torque controller 360 is defective, even while the braking system is in the state inhibiting the regenerative braking torque control. The energy efficiency can be improved by permitting the control of the regenerative braking torque while the anti-lock brake control is not effected. The above-indicated three conditions may be considered to be the conditions for permitting the control of the regenerative braking torque.

Normally, the control of the regenerative braking torque by the regenerative braking device 298 is permitted. This control is inhibited when the above-indicated condition for inhibiting the control is satisfied. Even when the condition for inhibiting the regenerative braking torque control is satisfied, the inhibition of this control is cancelled and the control is permitted if any one of the above-indicated three permitting conditions is satisfied.

In the regenerative braking torque compensating pressure decrease control, the pressure decreasing time is made shorter than in the normal pressure decrease mode, so that the rate of decrease in the wheel brake cylinder pressure is reduced. The pressure decreasing time is reduced by a compensating amount which decreases with an increase in the time lapse after the initiation of the transient anti-lock brake control (with an increase in the time duration of the transient anti-lock brake control). The actual regenerative braking torque cannot be zeroed immediately after the control of the regenerative braking torque is inhibited. That is, a certain time is required for the regenerative braking torque to have been zeroed. In other words, the regenerative braking torque decreases with an increase in the time duration of the transient anti-lock brake control, so that the influence of the regenerative braking torque is accordingly reduced with the increase of the above-indicated time duration. In view of this, the compensating amount is reduced with the time duration of the transient anti-lock brake control, so that the regenerative braking torque compensating pressure decrease control is modified toward the normal pressure decrease mode. The pressure decreasing time may also be reduced by selecting a dither decrease mode or pressure hold mode. These dither decrease mode and pressure hold mode may be selected when the wheel deceleration value is not so high.

Normally, the regenerative braking torque compensating pressure decrease control (transient anti-lock brake control) is permitted. This control is inhibited when a condition for inhibiting the control is satisfied. That is, the regenerative braking torque compensating pressure decrease control is inhibited when at least one of the following conditions is satisfied: (x) where the anti-lock brake control initiating condition is satisfied more than a predetermined time after the OFF signal is generated by the motor control device 42; (y) where the pressure decrease mode has changed to the pressure increase mode; and (z) where the OFF signal from the motor control device 42 is present upon determination as to whether the condition for inhibiting the regenerative braking torque control is satisfied. The regenerative braking torque compensating pressure decrease control is not necessary when the regenerative braking torque is small enough and may be considered to be zero. When the pressure decrease mode has changed to the pressure increase mode, the regenerative braking torque compensating pressure decrease control is inhibited, so that the control is inhibited when the pressure decrease mode is selected again. The control of the regenerative braking torque is permitted again when the anti-lock brake control is terminated.

While the first embodiment is adapted not to restrict the amount of decrease of the wheel brake cylinder pressure when the pressure decrease mode is selected, the present second embodiment is adapted to restrict the amount of decrease of the wheel brake cylinder pressure when the pressure decrease mode is selected. The regenerative braking torque compensating pressure decrease control is implemented only when the pressure decrease mode is selected for the first time.

In the regenerative braking torque compensating pressure increase control, the pressure increasing time is made longer than in the normal anti-lock brake control. That is, the pressure increasing time is increased by a compensating amount, which decreases with an increase in the time duration of the anti-lock brake control, like the compensating amount used in the regenerative braking torque compensating pressure decrease control. The regenerative braking torque compensating pressure increase control is normally inhibited, but is permitted when all of the following conditions are satisfied: (p) where the friction coefficient of the road surface is higher than a predetermined threshold; (q) where the pressure increase time control sub-mode is selected; and (r) the regenerative braking torque compensating pressure decrease control has been effected. Thus, like the regenerative braking torque compensating pressure decrease control, the regenerative braking torque compensating pressure increase control is implemented only when the pressure increase time control sub-mode is selected for the first time. When the above conditions (p), (q) and (r) are satisfied and when the brake pedal 76 is further depressed, the pressure increase control time consisting of the pressure increasing and holding times is also increased.

In a regenerative braking torque compensating pulse number increase control, the pressure increasing time and the pressure holding time are compensated according to a stored table, so as to increase the ratio of the pressure increasing time to the pressure holding time. The regenerative braking torque pulse number increase control is normally permitted, but is inhibited when all of the following conditions are satisfied: (s) where the regenerative braking torque compensating pressure increase control has been effected; (t) where the friction coefficient of the road surface is higher than a predetermined threshold; and (u) where the pulse number increase sub-mode is selected for the first time. Thus, the regenerative braking torque compensating pulse number increase control is implemented only once.

The regenerative braking torque compensating pulse number increase control for a given wheel may be permitted when the regenerative braking torque compensating pressure decrease control has been effected in the pressure decrease mode. Since the regenerative braking torque compensating pressure decrease control is implemented only once, the regenerative braking torque compensating pulse number increase control is implemented only once.

Referring to the flow chart of FIGS. 8A–8B, there will be explained a hydraulic braking torque control routine in the present second embodiment of the invention.

The routine is initiated with steps S101–S103 to determine whether an anti-lock brake control is effected for a wheel in question, whether the condition for inhibiting the regenerative braking torque control is satisfied for the wheel, and whether the anti-lock brake control initiating condition is satisfied for the wheel. Since the condition for inhibiting the regenerative braking torque control is more severe than the anti-lock brake control initiating condition, the determination regarding the former condition precedes the determination regarding the latter condition. When the condition for inhibiting the regenerative braking torque control is satisfied, the control flow goes to steps S104 and S105 to supply the motor control device 42 with the information for inhibiting the regenerative braking torque control and set an anti-lock brake control flag to "1".

When the anti-lock brake control is effected, the control flow goes to step S106 to determine whether the condition for terminating the anti-lock brake control or the condition for permitting the regenerative braking torque control is satisfied. If none of these conditions are satisfied, the control flow goes to steps S107–S109 to select the brake control mode, and determine whether the selected brake control mode is the pressure decrease mode or the pressure increase mode. If the selected brake control mode is the pressure decrease mode, the control flow goes to step S110 to determine whether the condition for inhibiting the regenerative braking torque compensating pressure decrease control is satisfied. If this condition is not satisfied, the control flow goes to step S112 in which the regenerative braking torque compensating pressure decrease control is effected. If the condition is satisfied, the control flow goes to step S111 in which the normal pressure decrease control is effected. Since the regenerative braking torque compensating pressure decrease control is normally permitted, this control is effected unless the inhibiting condition is satisfied.

Where the determined brake control mode is the pressure increase time control mode of the pressure increase sub-mode, the control flow goes to step S113 to determine whether the condition for permitting the regenerative braking torque compensating pressure increase control is satisfied. If this condition is satisfied, the control flow goes to step S114 in which the regenerative braking torque compensating pressure increase control is effected. If the condition is not satisfied, the control flow goes to step S115 in which the normal pressure increase control is effected. Since the regenerative braking torque compensating pressure increase control is normally inhibited, this control is not effected until the condition for permitting the control is satisfied. Where the pulse number increase sub-mode is selected, the regenerative braking torque compensating pulse number increase control is effected if the condition for inhibiting this control is not satisfied, and the normal pulse number increase control is effected if this condition is satisfied. This portion of the hydraulic braking torque control routine is not shown in the flow chart of FIGS. 8A–8B.

When the determined brake control mode is the pressure hold mode, the control flow goes to step S116 in which the pressure hold control is effected.

If the condition for terminating the anti-lock brake control or the condition for permitting the regenerative braking torque control is satisfied, the control flow goes to steps S117, S118 and S119 to reset the anti-lock brake control flag to "0", permit the control of the regenerative braking torque and permit the regenerative braking torque compensating pressure decrease control and the regenerative braking torque compensating pulse number increase control. In step S118, the directional control valves 308, 310 and the various solenoid-operated shut-off valves are restored to their original positions. In step S119, the motor control device 42 is supplied with the information for permitting the control of the regenerative braking control, to permit the regenerative braking torque compensating pressure decrease control and the regenerative braking torque compensating pulse number increase control.

In the braking system according to this second embodiment of the present invention, the transient anti-lock brake control is arranged so as to decrease the amount of decrease of the wheel brake cylinder pressure and increase the amount of increase of the wheel brake cylinder pressure. This arrangement is effective to reduce the amount of decrease of the total braking torque of the drive wheels due to zeroing of the regenerative braking torque, and to reduce the influence of the zeroing of the regenerative braking torque.

It will be understood that a portion of the hydraulic braking torque controller 360 assigned to implement steps S112 and S114 constitutes anti-lock control means operable during application of both of regenerative and frictional braking torques.

The hydraulic braking devices 30, 300 may be replaced by an electrically operated braking device or a piezoelectric braking device. The electrically operated braking device may be adapted such that brake pads are forced onto a rotor rotating with a vehicle wheel, by activation of an electric motor. The piezoelectric braking device may be adapted such that the brake pads are forced onto the rotor, by utilizing deformation of an piezoelectric element.

It is to be understood that the present invention may be embodied with various other changes, modifications and improvements, which may occur to those skilled in the art, without departing from the spirit and scope of the invention defined in the appended claims.

What is claimed is:

1. A braking system in a motor vehicle having a plurality of wheels which include at least one drive wheel, comprising:

a frictional braking device for forcing a friction member onto a rotor rotating with each of said plurality of wheels, to thereby apply a frictional braking torque to each of said plurality of wheels;

a regenerative braking device including at least one electric motor which is connected to said at least one drive wheel, to apply a regenerative braking torque to said at least one drive wheel; and total braking torque control means for controlling a total braking torque including at least one of said regenerative braking torque and said frictional braking torque which are applied to each of said plurality of wheels, said total braking torque control means operating when the total braking torque applied to each of at least one slipping wheel of said plurality of wheels has exceeded an upper limit corresponding to a friction coefficient of a road surface on which said motor vehicle is running, for zeroing said regenerative braking torque of each of said at least one drive wheel and controlling said frictional braking torque of each of at least one of said plurality of wheels by reducing the amount of decrease of the frictional braking torque as compared with that in an anti-lock braking system which does not include said regenerative braking device or as compared with that in a normal anti-lock control of the frictional braking device when the regenerative braking torques of all the wheels are zero, said controlling of said frictional braking torque reducing an influence of the zeroing of said regenerative braking torque.

2. A braking system according to claim 1, wherein said frictional braking device includes (a) a common controller for commonly controlling the frictional braking torques of said plurality of wheels, and (b) independent controllers for controlling the frictional braking torques of said plurality of wheels, respectively, independently of each other, and said total braking torque control means includes (c) cooperative control means for controlling said common controller such that a sum of said frictional braking torque and said regenerative braking torque coincides with a desired braking torque value desired by an operator of the motor vehicle, and (d) anti-lock control means for controlling said independent controllers such that the frictional braking torque of each wheel controlled by a corresponding one of said independent controllers permits said each wheel to be held in a substantially optimum slipping state.

3. A braking system according to claim 1, wherein said total braking torque control means includes braking torque control means comprising at least one of (1) drive-wheel anti-lock control means for controlling the frictional braking torque applied to each of said at least one drive wheel whose total braking torque has exceeded said upper limit, so as to hold each of said at least one drive wheel in a substantially optimum slipping state while restricting a decrease of the total braking torque due to the zeroing of said regenerative braking torque, and (2) frictional braking torque increase gradient restricting means for restricting a gradient of increase of the frictional braking torque of at least one of said plurality of wheels other than said at least one slipping wheel whose total braking torque has exceeded said upper limit.

4. A braking system in a motor vehicle having a plurality of wheels which include at least one drive wheel, comprising:
  a frictional braking device for forcing a friction member onto a rotor rotating with each of said plurality of wheels, to thereby apply a frictional braking torque to each of said plurality of wheels;
  a regenerative braking device including at least one electric motor which is connected to said at least one drive wheel, to apply a regenerative braking torque to said at least one drive wheel; and
  total braking torque control means for controlling a total braking torque applied to each of said plurality of wheels, said total braking torque including at least one of said frictional braking torque and said regenerative braking torque,
  and wherein said total braking torque control means includes
    first anti-lock control means for controlling said total braking torque applied to each of at least one slipping wheel of said plurality of wheels, so as to hold each of said at least one wheel in a substantially optimum slipping state when said total braking torque applied to each of said at least one slipping wheel has exceeded an upper limit corresponding to a friction coefficient of a road surface on which the motor vehicle is running, while one of said regenerative braking torque and said frictional braking torque of said total braking torque applied to said plurality of wheels is zero, and
    braking torque control means for controlling said total braking torques applied to said plurality of wheels when said total braking torque applied to each of said at least one slipping wheel has exceeded said upper limit while neither said regenerative braking torque nor said frictional braking torque which are applied to said plurality of wheels are zero, said braking torque control means including (1) regenerative braking torque reducing means for zeroing said regenerative braking torque, and (2) at least one of (a) second anti-lock control means for controlling said frictional braking torque of each of said at least one drive wheel whose total braking torque has exceeded said upper limit, so as to hold each of said at least one drive wheel in a substantially optimum slipping state and such that said frictional braking torque controlled by said second anti-lock control means is generally larger than said frictional braking torque controlled by said first anti-lock control means, and (b) frictional braking torque increase gradient restricting means for restricting a gradient of increase of the frictional braking torque of at least one of said plurality of wheels other than said at least one slipping wheel whose total braking torque has exceeded said upper limit.

5. A braking system according to claim 4, wherein said braking torque control means includes both of said second anti-lock control means and said frictional braking torque increase gradient restricting means.

6. A braking system according to claim 4, wherein said braking torque control means includes said second anti-lock control means.

7. A braking system according to claim 4, wherein said braking torque control means includes said frictional braking torque increase gradient restricting means.

8. A braking system according to claim 4, wherein said total braking torque control means includes switching means for disabling said second anti-lock control means and enabling said first anti-lock control means.

9. A braking system according to claim 8, wherein said switching means disables said second anti-lock control means and enables said first anti-lock control means when a predetermined condition is satisfied, said predetermined condition including at least one of: a condition that the total braking torque of the drive wheel whose regenerative braking torque has been zeroed by said regenerative braking torque reducing means and whose frictional braking torque is controlled by said second anti-lock control means has been increased by a first amount sufficient to compensate for an amount of reduction of said total braking torque caused by the zeroing of said regenerative braking torque; a condition that the frictional braking torque of the at least one wheel whose total braking torque is not controlled by the braking torque control means has increased by a second amount substantially equal to said total braking torque before said regenerative braking torque is zeroed; and a predetermined time has passed after said regenerative braking torque is zeroed.

10. A braking system according to claim 1, wherein said total braking torque control means includes hunting restraining means for restraining a change in said total braking torque of each of said plurality of wheels when hunting of the rotating speed of said plurality of wheels is detected.

11. A braking system according to claim 4, wherein said total braking torque control means includes hunting restraining means for restraining a change in said total braking torque of each of said plurality of wheels when hunting of the rotating speed of said plurality of wheels is detected.

12. A braking system according to claim 10, wherein said total braking torque control means includes inhibiting means for inhibiting said hunting restraining means from restraining a change in said total braking torque while said frictional braking torque is being controlled to reduce the influence of said zeroing of said regenerative braking torque.

13. A braking system according to claim 11, wherein said total braking torque control means includes inhibiting means for inhibiting said hunting restraining means from restraining a change in said total braking torque while said second anti-lock control means is operated.

14. A braking system according to claim 3, wherein said frictional braking device includes (a) a common controller for commonly controlling the frictional braking torques of said plurality of wheels, and (b) independent controllers for controlling the frictional braking torques of said plurality of wheels, respectively, independently of each other, and said total braking torque control means includes (c) cooperative control means for controlling said common controller such that a sum of said frictional braking torque and said regenerative braking torque coincides with a desired braking torque value desired by an operator of the motor vehicle, and (d) anti-lock control means for controlling said independent controllers such that the frictional braking torque of each of said plurality of wheels controlled by a corresponding one of said independent controllers holds said each wheel in a substantially optimum slipping state, said anti-lock control means including said drive-wheel anti-lock control means.

15. A braking system according to claim 4, wherein said frictional braking device includes (a) a common controller for commonly controlling the frictional braking torques of said plurality of wheels, and (b) independent controllers for controlling the frictional braking torques of said plurality of wheels, respectively, independently of each other, and said total braking torque control means includes (c) cooperative control means for controlling said common controller such that a sum of said frictional braking torque and said regenerative braking torque coincides with a desired braking torque value desired by an operator of the motor vehicle, and (d) anti-lock control means for controlling said independent controllers such that the frictional braking torque of each of said plurality of wheels controlled by a corresponding one of said independent controllers holds said each wheel in a substantially optimum slipping state, said anti-lock control means including said drive-wheel anti-lock control means.

16. A braking system in a motor vehicle having a plurality of wheels which include at least one drive wheel, comprising:

a frictional braking device for forcing a friction member onto a rotor rotating with each of said plurality of wheels, to thereby apply a frictional braking torque to each of said plurality of wheels;

first anti-lock control means for controlling said frictional braking torque applied to each of at least one slipping wheel of said plurality of wheels, so as to hold each of said at least one slippiing wheel in a substantially optimum slipping state when the frictional braking torque applied to each of said at least one slipping wheel has exceeded an upper limit corresponding to a friction coefficient of a road surface on which the motor vehicle is running;

a regenerative braking device including at least one electric motor which is connected to said at least one drive wheel, to apply a regenerative braking torque to said at least one drive wheel; and total braking torque control means for controlling a total braking torque including at least one of said frictional braking torque and said regenerative braking torque applied to said plurality of wheels when said total braking torque applied to said at least one slipping wheel has exceeded said upper limit while neither said regenerative braking torque applied to each of said at least one slipping wheel nor said frictional braking torque applied to each of said at least one slipping wheel are zero, said total braking torque control means including (1) regenerative braking torque reducing means for zeroing said regenerative braking torque, and (2) at least one of (a) second anti-lock control means for controlling said frictional braking torque of each of said at least one drive wheel whose total braking torque has exceeded said upper limit, so as to hold said each of said at least one drive wheel in a substantially optimum slipping state and such that said frictional braking torque controlled by said second anti-lock control means is generally larger than said frictional braking torque controlled by said first anti-lock control means, and (b) frictional braking torque increase gradient restricting means for restricting a gradient of increase of the frictional braking torque of at least one of said plurality of wheels other than said at least one slipping wheel whose total braking torque has exceeded said upper limit.

17. A braking system in a motor vehicle having a plurality of wheels which include at least one drive wheel, comprising:

a frictional braking device for forcing a friction member onto a rotor rotating with each of said plurality of wheels, to thereby apply a frictional braking torque to each of said plurality of wheels;

a regenerative braking device including at least one electric motor which is connected to said at least one drive wheel, to apply a regenerative braking torque to said at least one drive wheel; and total braking torque control means for controlling a total braking torque including at least one of said regenerative braking torque and said frictional braking torque which are applied to each of said plurality of wheels, said total braking torque control means operating when the total braking torque applied to each of at least one slipping wheel of said plurality of wheels has exceeded an upper limit corresponding to a friction coefficient of a road surface on which said motor vehicle is running, for zeroing said regenerative braking torque of each of said at least one drive wheel and controlling said frictional braking torque of each of at least one of said plurality of wheels, wherein said total braking torque control means includes means for controlling said total braking torque of each of said at least one slipping wheel in a first anti-lock control mode when said regenerative braking torque of said at least one drive wheel is not zero, and means for controlling said frictional braking torque of each of said at least one slipping wheel in a second anti-lock control mode when said regenerative braking torque of said at least one drive wheel is zeroed;

-said frictional braking torque of each at least one slipping drive wheel of said at least one drive wheel being controlled in said second anti-lock control mode such that a gradient of increase of said frictional braking torque is higher in said second anti-lock control mode than in said first anti-lock control mode.

* * * * *